United States Patent
Li et al.

(10) Patent No.: US 10,333,159 B2
(45) Date of Patent: Jun. 25, 2019

(54) CHARGE CAPACITY MANAGEMENT IN REDOX FLOW BATTERY STRING

(71) Applicant: UniEnergy Technologies, LLC, Mukilteo, WA (US)

(72) Inventors: Liyu Li, Bellevue, WA (US); Chenxi Sun, Mukilteo, WA (US); Jinfeng Wu, Mukilteo, WA (US)

(73) Assignee: UniEnergy Technologies, LLC, Mukilteo, WA (US)

( * ) Notice: Subject to any disclaimer, the term of this patent is extended or adjusted under 35 U.S.C. 154(b) by 646 days.

(21) Appl. No.: 14/793,697

(22) Filed: Jul. 7, 2015

(65) Prior Publication Data

US 2016/0006052 A1    Jan. 7, 2016

Related U.S. Application Data

(60) Provisional application No. 62/021,650, filed on Jul. 7, 2014.

(51) Int. Cl.
  *H01M 8/04276* (2016.01)
  *H01M 8/18* (2006.01)
  *H01M 8/04082* (2016.01)

(52) U.S. Cl.
  CPC ... *H01M 8/04276* (2013.01); *H01M 8/04201* (2013.01); *H01M 8/188* (2013.01); *Y02E 60/528* (2013.01)

(58) Field of Classification Search
  None
  See application file for complete search history.

(56) References Cited

U.S. PATENT DOCUMENTS

| | | |
|---|---|---|
| 3,664,929 A | 5/1972 | White |
| 6,261,714 B1 | 7/2001 | Eidler |

(Continued)

FOREIGN PATENT DOCUMENTS

JP    2003303611 A    10/2003

OTHER PUBLICATIONS

International Preliminary Report on Patentability dated Jan. 19, 2017, issued in corresponding International Application No. PCT/US2015/039445, filed Jul. 7, 2015, 28 pages.

(Continued)

*Primary Examiner* — Alix E Eggerding
(74) *Attorney, Agent, or Firm* — Christensen O'Connor Johnson Kindness PLLC

(57) ABSTRACT

A method of operating a redox flow battery string includes providing a plurality of redox flow batteries, each redox flow battery in electrical communication with at least one other redox flow battery, and each redox flow battery comprising an anolyte storage tank including a quantity of anolyte, a catholyte storage tank including a quantity of catholyte, and an electrochemical cell in fluid communication with the anolyte and catholyte storage tanks; obtaining an open circuit voltage value for each redox flow battery in the string; identifying a predetermined open circuit voltage value in the string; and adjusting the open circuit voltage value for each redox flow battery to correspond to the predetermined open circuit voltage value. A redox flow battery string system includes a plurality of redox flow batteries each redox flow battery in electrical communication with at least one other redox flow battery having an open circuit voltage value.

25 Claims, 34 Drawing Sheets

(56) References Cited

U.S. PATENT DOCUMENTS

| | | |
|---|---|---|
| 2005/0158614 A1* | 7/2005 | Hennessy ......... H01M 8/04186 |
| | | 429/61 |
| 2008/0220318 A1 | 9/2008 | Brereton |
| 2013/0154364 A1 | 6/2013 | Hennessy |
| 2013/0157162 A1 | 6/2013 | Dong |
| 2013/0316199 A1 | 11/2013 | Keshavarz |
| 2014/0057141 A1 | 2/2014 | Mosso |
| 2014/0139190 A1 | 5/2014 | Parakulam |
| 2016/0315339 A1* | 10/2016 | Darling ................. H01M 8/188 |

OTHER PUBLICATIONS

International Search Report dated Dec. 4, 2015, issued in corresponding International Application No. PCT/US2015/039445, filed Jul. 7, 2015, 7 pages.
Written Opinion of the International Searching Authority dated Dec. 4, 2015, issued in corresponding International Application No. PCT/US2015/039445, filed Jul. 7, 2015, 26 pages.

* cited by examiner

CHARGE CAPACITY MANAGEMENT IN REDOX FLOW BATTERY STRING

CROSS-REFERENCE TO RELATED APPLICATION

This application claims the benefit of U.S. Provisional Application No. 62/021,650, filed Jul. 7, 2014, the disclosure of which is expressly incorporated by reference herein in its entirety.

BACKGROUND

Concerns over the environmental consequences of burning fossil fuels have led to an increasing use of renewable energy generated from sources such as solar and wind. The intermittent and varied nature of such renewable energy sources, however, has made it difficult to fully integrate these energy sources into existing electrical power grids and distribution networks. A solution to this problem has been to employ large-scale electrical energy storage (EES) systems. These systems are widely considered to be an effective approach to improve the reliability, power quality, and economy of renewable energy derived from solar or wind sources.

In addition to facilitating the integration of renewable wind and solar energy, large scale EES systems also may have the potential to provide additional value to electrical grid management, for example: resource and market services at the bulk power system level, such as frequency regulation, spinning reserves, fast ramping capacity, black start capacity, and alternatives for fossil fuel peaking systems; transmission and delivery support by increasing capability of existing assets and deferring grid upgrade investments; micro-grid support; and peak shaving and power shifting.

Among the most promising large-scale EES technologies are redox flow batteries (RFBs). RFBs are special electrochemical systems that can repeatedly store and convert megawatt-hours (MWhs) of electrical energy to chemical energy and chemical energy back to electrical energy when needed. RFBs are well-suited for energy storage because of their ability to tolerate fluctuating power supplies, bear repetitive charge/discharge cycles at maximum rates, initiate charge/discharge cycling at any state of charge, design energy storage capacity and power for a given system independently, deliver long cycle life, and operate safely without fire hazards inherent in some other designs.

In simplified terms, an RFB electrochemical cell is a device capable of either deriving electrical energy from chemical reactions, or facilitating chemical reactions through the introduction of electrical energy. In general, an electrochemical cell includes two half-cells, each having an electrolyte. The two half-cells may use the same electrolyte, or they may use different electrolytes. With the introduction of electrical energy, species from one half-cell lose electrons (oxidation) to their electrode while species from the other half-cell gain electrons (reduction) from their electrode.

Multiple RFB electrochemical cells electrically connected together in series within a common housing are generally referred to as an electrochemical "stack". Multiple stacks electrically connected together are generally referred to as a "string". Multiple stings electrically connected together are generally referred to as a "site".

A common RFB electrochemical cell configuration includes two opposing electrodes separated by an ion exchange membrane or other separator, and two circulating electrolyte solutions, referred to as the "anolyte" and "catholyte". The energy conversion between electrical energy and chemical potential occurs instantly at the electrodes when the liquid electrolyte begins to flow through the cells.

To meet industrial demands for efficient, flexible, rugged, compact, and reliable large-scale ESS systems with rapid, scalable, and low-cost deployment, there is a need for improved RFB systems.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one embodiment of the present disclosure, a method of operating a redox flow battery string is provided. The method includes providing a plurality of redox flow batteries, each redox flow battery in electrical communication with at least one other redox flow battery, and each redox flow battery comprising an anolyte storage tank including a quantity of anolyte, a catholyte storage tank including a quantity of catholyte, and an electrochemical cell in fluid communication with the anolyte and catholyte storage tanks; obtaining an open circuit voltage value for each redox flow battery in the string; identifying a predetermined open circuit voltage value in the string; and adjusting the open circuit voltage value for each redox flow battery to correspond to the predetermined open circuit voltage value.

In accordance with another embodiment of the present disclosure, a redox flow battery string system comprising a plurality of redox flow batteries is provided, each redox flow battery in electrical communication with at least one other redox flow battery and in operation, each redox flow battery having an open circuit voltage value. Each redox flow battery includes an anolyte storage tank configured for containing a quantity of an anolyte; a catholyte storage tank configured for containing a quantity of a catholyte; an electrochemical cell configured for fluid communication with the anolyte and catholyte storage tanks; and a conduit interconnecting the anolyte storage tank and catholyte storage tank, wherein the conduit is configured to provide a liquid to flow between the anolyte and catholyte storage tanks in response to a condition.

In accordance with another embodiment of the present disclosure, a redox flow battery string system comprising a plurality of redox flow batteries is provided, each redox flow battery in electrical communication with at least one other redox flow battery and in operation, each redox flow battery having an open circuit voltage value. Each redox flow battery includes an anolyte storage tank configured for containing a quantity of an anolyte; a catholyte storage tank configured for containing a quantity of a catholyte; an electrochemical cell configured for fluid communication with the anolyte and catholyte storage tanks; and means for transferring anolyte or catholyte between the anolyte and catholyte storage tanks.

In any of the embodiments or methods described herein, each redox flow battery may not be in fluid communication with any other redox flow battery.

In any of the embodiments or methods described herein, each redox flow battery may include a predetermined ratio of an amount of redox-active materials in the anolyte and an amount of redox-active materials in the catholyte, the predetermined ratio being correlated to the open circuit voltage value.

In any of the embodiments or methods described herein, each redox flow battery may include a predetermined volume ratio of anolyte and the catholyte, the predetermined volume ratio being correlated to the open circuit voltage value.

In any of the embodiments or methods described herein, the predetermined volume ratio of the anolyte to the catholyte, or the catholyte to the anolyte, may be 1:1.05 to 1:1.50.

In any of the embodiments described herein, adjusting the open circuit voltage for each redox flow battery may include transferring a volume of catholyte to the anolyte storage tank, or a volume of anolyte to the catholyte storage tank of the redox flow battery.

In any of the embodiments or methods described herein, the volume of catholyte may be transferred from the catholyte storage tank of the same redox flow battery. In any of the embodiments or methods described herein, the volume of catholyte may be transferred from a catholyte storage tank of a different redox flow battery.

In any of the embodiments or methods described herein, the volume of anolyte may be transferred from the anolyte storage tank of the same redox flow battery.

In any of the embodiments or methods described herein, the volume of anolyte may be transferred from an anolyte storage tank of a different redox flow battery.

In any of the embodiments or methods described herein, transferring the volume of catholyte or anolyte may include a continuous catholyte or anolyte transfer.

In any of the embodiments or methods described herein, transferring the volume of catholyte or anolyte may include a periodic catholyte or anolyte transfer.

In any of the embodiments or methods described herein, transferring a volume of catholyte or anolyte may include flowing the volume of catholyte or anolyte through a conduit interconnecting the anolyte storage tank and catholyte storage tank of each redox flow battery.

In any of the embodiments or methods described herein, the conduit may be an overflow pipe.

In any of the embodiments or methods described herein, transferring the volume of catholyte or anolyte may include pumping the catholyte or anolyte through a conduit interconnecting the anolyte storage tank and catholyte storage tank.

In any of the embodiments or methods described herein, further comprising passively transferring the volume of catholyte or anolyte.

In any of the embodiments or methods described herein, further comprising actively transferring the volume of catholyte or anolyte.

In any of the embodiments or methods described herein, further comprising passively and actively transferring the volume of catholyte or anolyte.

In any of the embodiments or methods described herein, adjusting the open circuit voltage may include adding an oxidizing agent or a reducing agent to the anolyte storage tank or the catholyte storage tank of one or more redox flow batteries in the plurality of redox flow batteries.

In any of the embodiments or methods described herein, the oxidizing agent may be selected from the group consisting of air, oxygen, hydrogen peroxide, ozone, or any combination thereof.

In any of the embodiments or methods described herein, the reducing agent may be selected from the group consisting of sugars, alcohols, organic acids, oils, hydrocarbons, and any combination thereof.

In any of the embodiments or methods described herein, adjusting the open circuit voltage may be controlled by a battery management system.

In any of the embodiments or methods described herein, adjusting the open circuit voltage may be performed during maintenance of the redox flow battery system.

In any of the embodiments or methods described herein, each redox flow battery may not be in fluid communication with another redox flow battery.

In any of the embodiments or methods described herein, the plurality of redox flow batteries may be electrically connected in series.

In any of the embodiments or methods described herein, each redox flow battery further may include a predetermined ratio of an amount of redox-active materials in the anolyte and an amount of redox-active materials in the catholyte, and a predetermined volume ratio of anolyte and the catholyte.

In any of the embodiments or methods described herein, the conduit may allow both gas and liquid to flow between the anolyte and catholyte storage tanks.

In any of the embodiments or methods described herein, further comprising a valve associated with the conduit in order to conditionally regulate flow between the anolyte and catholyte storage tanks.

In any of the embodiments or methods described herein, the valve may be configured to be controllable in response to receiving control signals.

In any of the embodiments or methods described herein, the conduit may be configured to passively transfer a liquid between the anolyte and catholyte storage tanks.

In any of the embodiments or methods described herein, the conduit may be configured to actively transfer a liquid between the anolyte and catholyte storage tanks.

In any of the embodiments or methods described herein, the conduit may allow catholyte to flow into the anolyte storage tank, or anolyte to flow into the catholyte storage tank, in response to the condition.

In any of the embodiments or methods described herein, the condition may include a deviation of the open circuit voltage value from a predetermined open circuit voltage value of a redox flow battery in the plurality of redox flow batteries.

In any of the embodiments or methods described herein, the condition may include a deviation of a volume ratio of the anolyte and catholyte from the predetermined volume ratio.

In any of the embodiments or methods described herein, comprising a vanadium-sulfate redox flow battery, vanadium-chloride redox flow battery, vanadium-mixed sulfate and chloride redox flow battery, vanadium-iron redox-flow battery, and iron-chromium redox flow battery.

In any of the embodiments or methods described herein, the means for transferring anolyte or catholyte between the anolyte and catholyte storage tanks may include passively transferring, actively transferring, or a combination of passively and actively transferring.

DESCRIPTION OF THE DRAWINGS

The foregoing aspects and many of the attendant advantages of this disclosure will become more readily appreciated by reference to the following detailed description, when taken in conjunction with the accompanying drawings, wherein.

DETAILED DESCRIPTION

Figure 1:
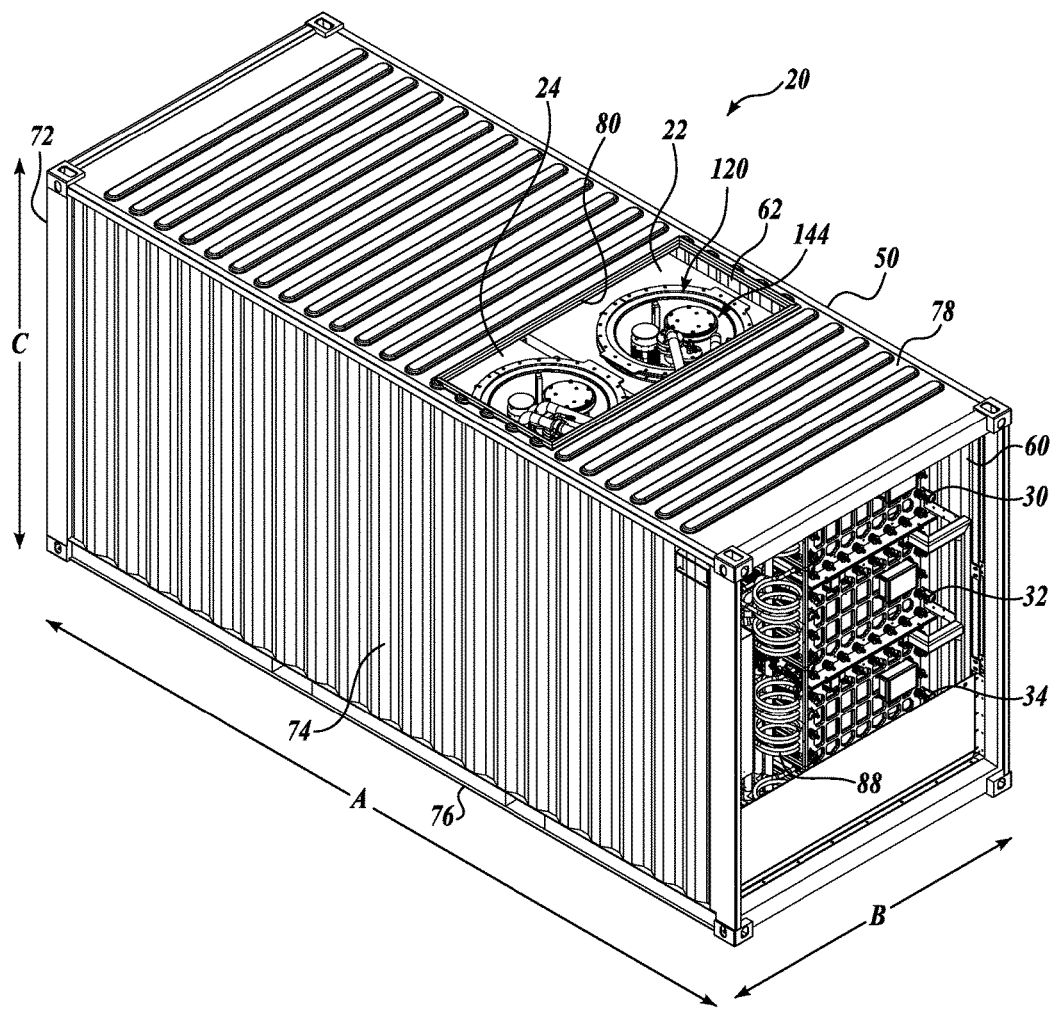
FIG. 1 is an isometric view of a redox flow battery (RFB) module in accordance with one embodiment of the present disclosure.
Figure 2:
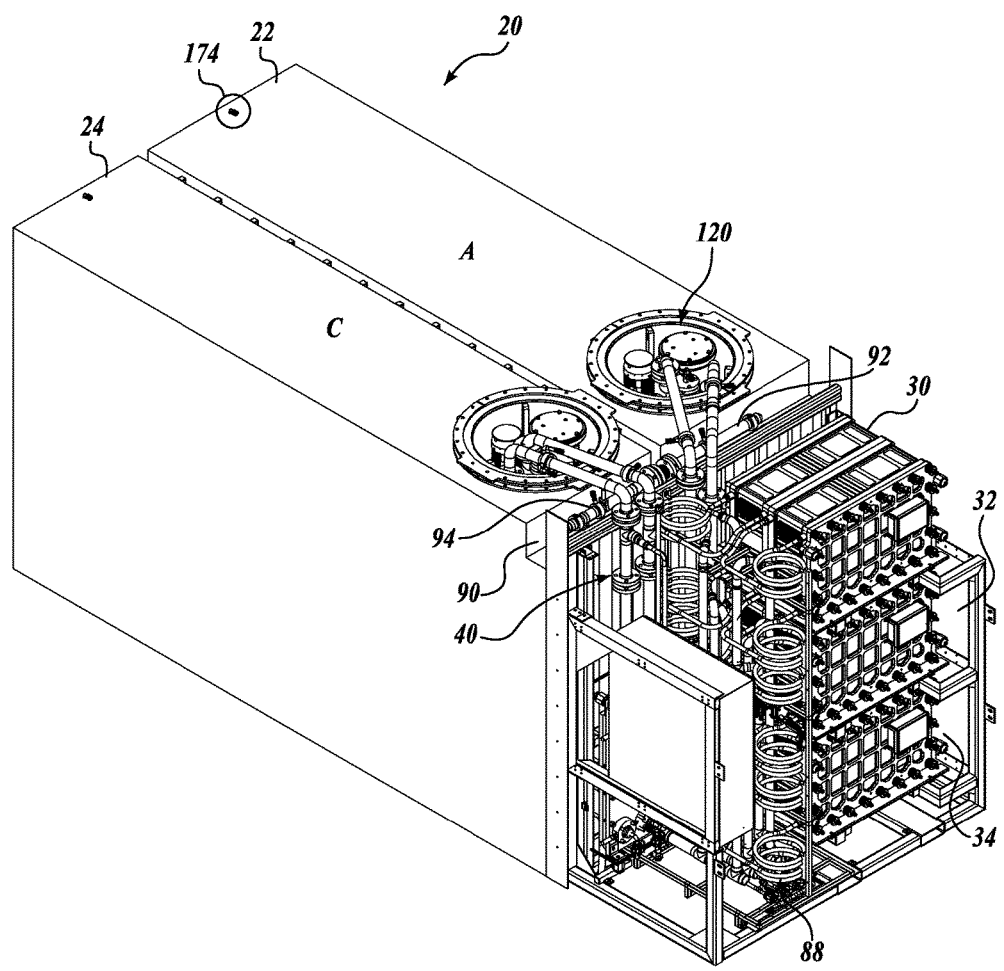
FIG. 2 is an isometric view of the RFB module of FIG. 1 with the outer container removed.
Figure 4:
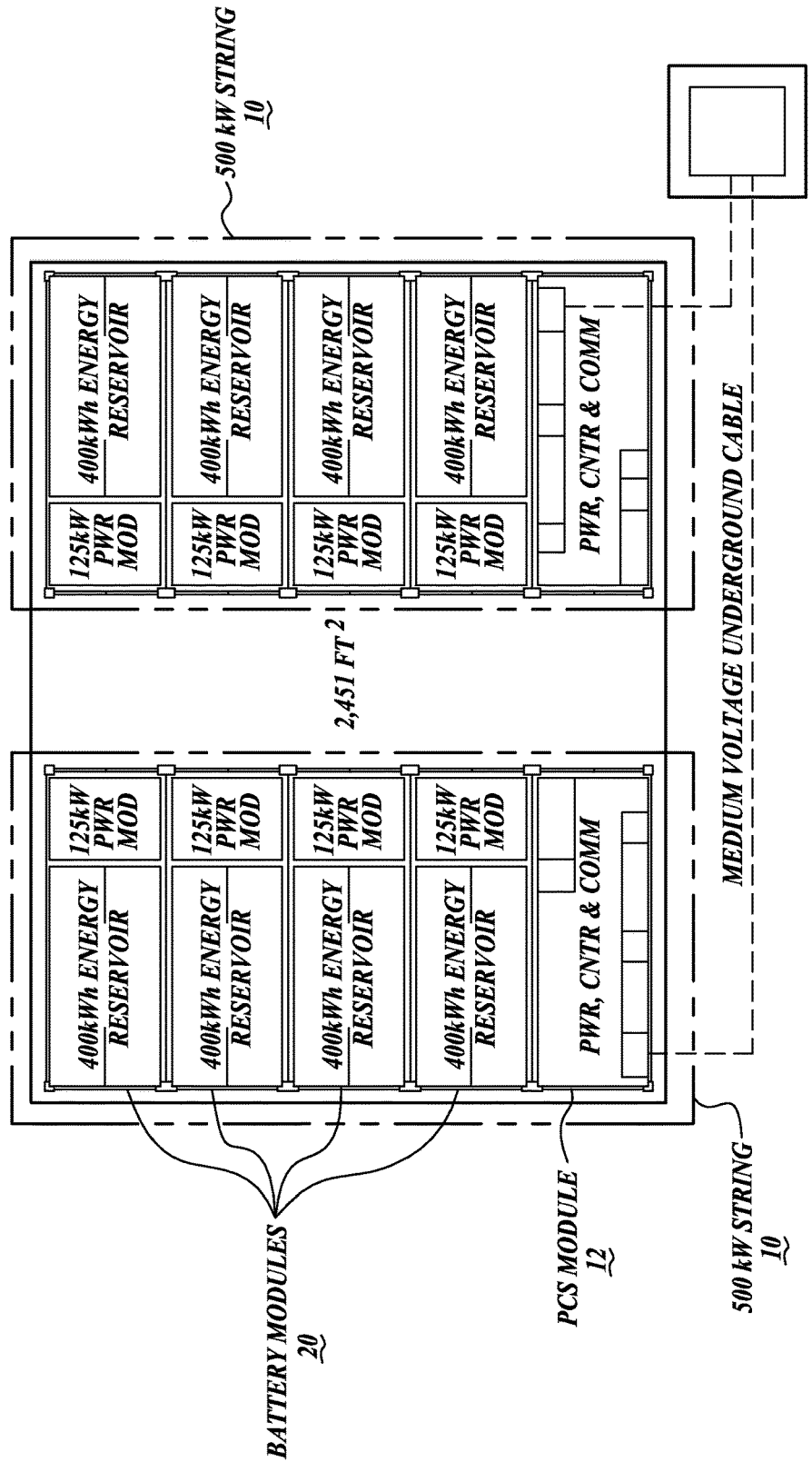
FIG. 4 is schematic view of a 1 MW site in accordance with one embodiment of the present disclosure.
Figure 5:
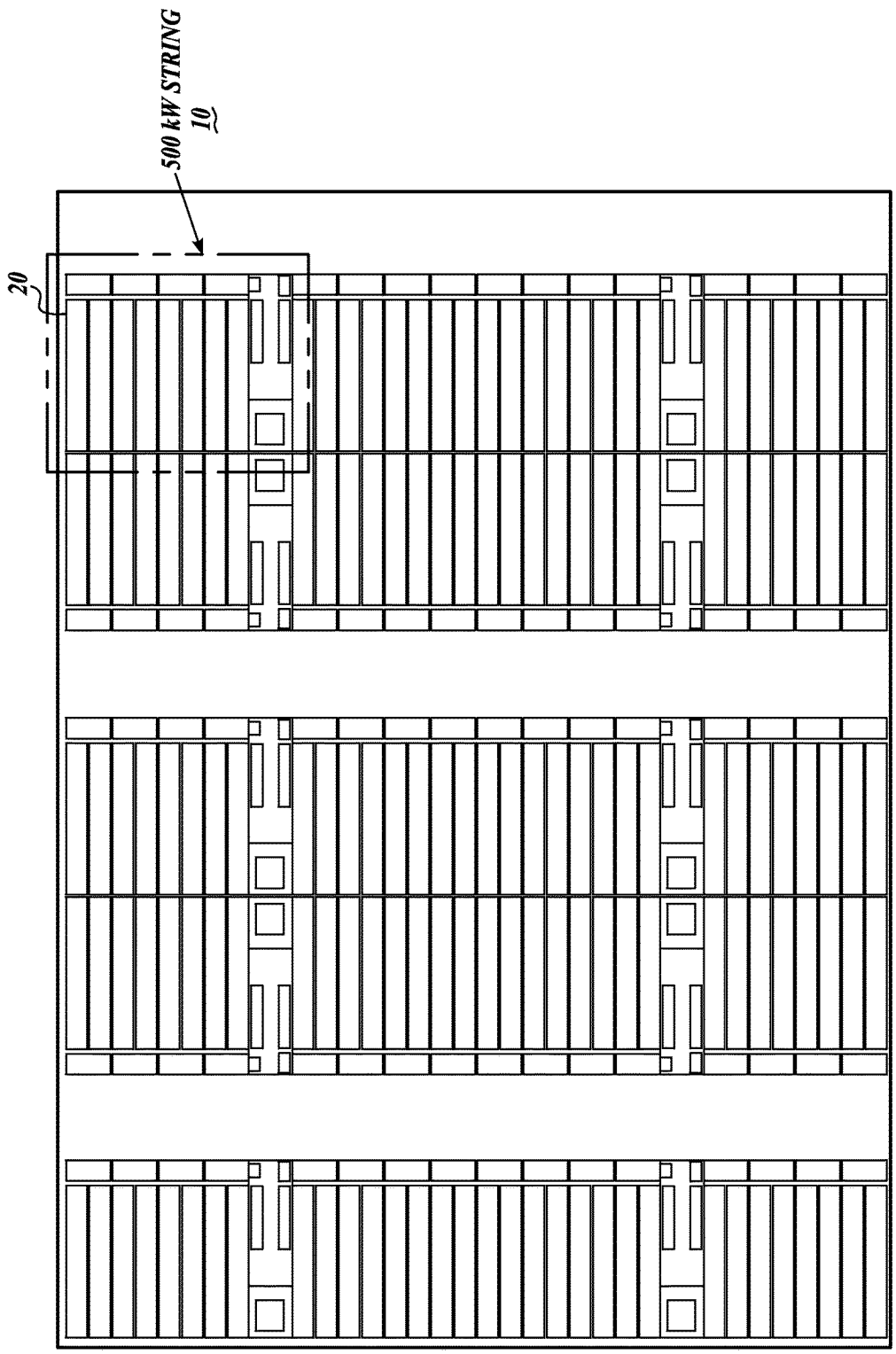
FIG. 5 is a schematic view of a 10 MW site in accordance with one embodiment of the present disclosure.

Embodiments of the present disclosure are directed to redox flow batteries (RFBs), systems and components thereof, stacks, strings, and sites, as well as methods of operating the same. Referring to FIGS. 1-3, a redox flow battery 20 in accordance with one embodiment of the present disclosure is provided. Multiple redox flow batteries may be configured in a "string" of batteries, and multiple strings may be configured into a "site" of batteries. Referring to FIG. 4, a non-limiting example of a site is provided, which includes two strings 10, each having four RFBs 20. Referring to FIG. 5, another non-limiting example of a site is provided, which includes twenty strings 10, each having four RFBs 20. RFBs, systems and components thereof, stacks, strings, and sites are described in greater detail below.

Redox Flow Battery

Referring to FIGS. 1 and 2, major components in an RFB 20 include the anolyte and catholyte tank assemblies 22 and 24, the stacks of electrochemical cells 30, 32, and 34, a system for circulating electrolyte 40, an optional gas management system 94, and a container 50 to house all of the components and provide secondary liquid containment.

In the present disclosure, flow electrochemical energy systems are generally described in the context of an exemplary vanadium redox flow battery (VRB), wherein a $V^{3+}/V^{2+}$ sulfate solution serves as the negative electrolyte ("anolyte") and a $V^{5+}/V^{4+}$ sulfate solution serves as the positive electrolyte ("catholyte"). However, other redox chemistries are contemplated and within the scope of the present disclosure, including, as non-limiting examples, $V^{2+}/V^{3+}$ vs. $Br^-/ClBr_2$, $Br_2/Br^-$ vs. $S/S^{2-}$, $Br^-/Br_2$ vs. $Zn^{2+}/Zn$, $Ce^{4+}/Ce^{3+}$ vs. $V^{2+}/V^{3+}$, $Fe^{3+}/Fe^{2+}$ vs. $Br_2/Br^-$, $Mn^{2+}/Mn^{3+}$ vs. $Br_2/Br^-$, $Fe^{3+}/Fe^{2+}$ vs. $Ti^{2+}/Ti^{4+}$, etc.

As a non-limiting example, in a vanadium flow redox battery (VRB) prior to charging, the initial anolyte solution and catholyte solution each include identical concentrations of $V^{3+}$ and $V^{4+}$. Upon charge, the vanadium ions in the anolyte solution are reduced to $V^{2+}/V^{3+}$ while the vanadium ions in the catholyte solution are oxidized to $V^{4+}/V^{5+}$.

Referring to the schematic in FIG. 3A, general operation of the redox flow battery system 20 of FIGS. 1 and 2 will be described. The redox flow battery system 20 operates by circulating the anolyte and the catholyte from their respective tanks that are part of the tank assemblies 22 and 24 into the electrochemical cells, e.g., 30 and 32. (Although only two electrochemical cells are needed to form a stack of cells, additional electrochemical cells in the illustrated embodiment of FIG. 3A include electrochemical cells 31, 33 and 35.) The cells 30 and 32 operate to discharge or store energy as directed by power and control elements in electrical communication with the electrochemical cells 30 and 32.

In one mode (sometimes referred to as the "charging" mode), power and control elements connected to a power source operate to store electrical energy as chemical potential in the catholyte and anolyte. The power source can be any power source known to generate electrical power, including renewable power sources, such as wind, solar, and hydroelectric. Traditional power sources, such as combustion, can also be used.

In a second ("discharge") mode of operation, the redox flow battery system 20 is operated to transform chemical potential stored in the catholyte and anolyte into electrical energy that is then discharged on demand by power and control elements that supply an electrical load.

Each electrochemical cell 30 in the system 20 includes a positive electrode, a negative electrode, at least one catholyte channel, at least one anolyte channel, and an ion transfer membrane separating the catholyte channel and the anolyte channel. The ion transfer membrane separates the electrochemical cell into a positive side and a negative side. Selected ions (e.g., H+) are allowed to transport across an ion transfer membrane as part of the electrochemical charge and discharge process. The positive and negative electrodes are configured to cause electrons to flow along an axis normal to the ion transfer membrane during electrochemical cell charge and discharge (see, e.g., line e⁻ in FIG. 3A). As can be seen in FIG. 3A, fluid inlets 48 and 44 and outlets 46 and 42 are configured to allow integration of the electrochemical cells 30 and 32 into the redox flow battery system 20.

Figure 3A:
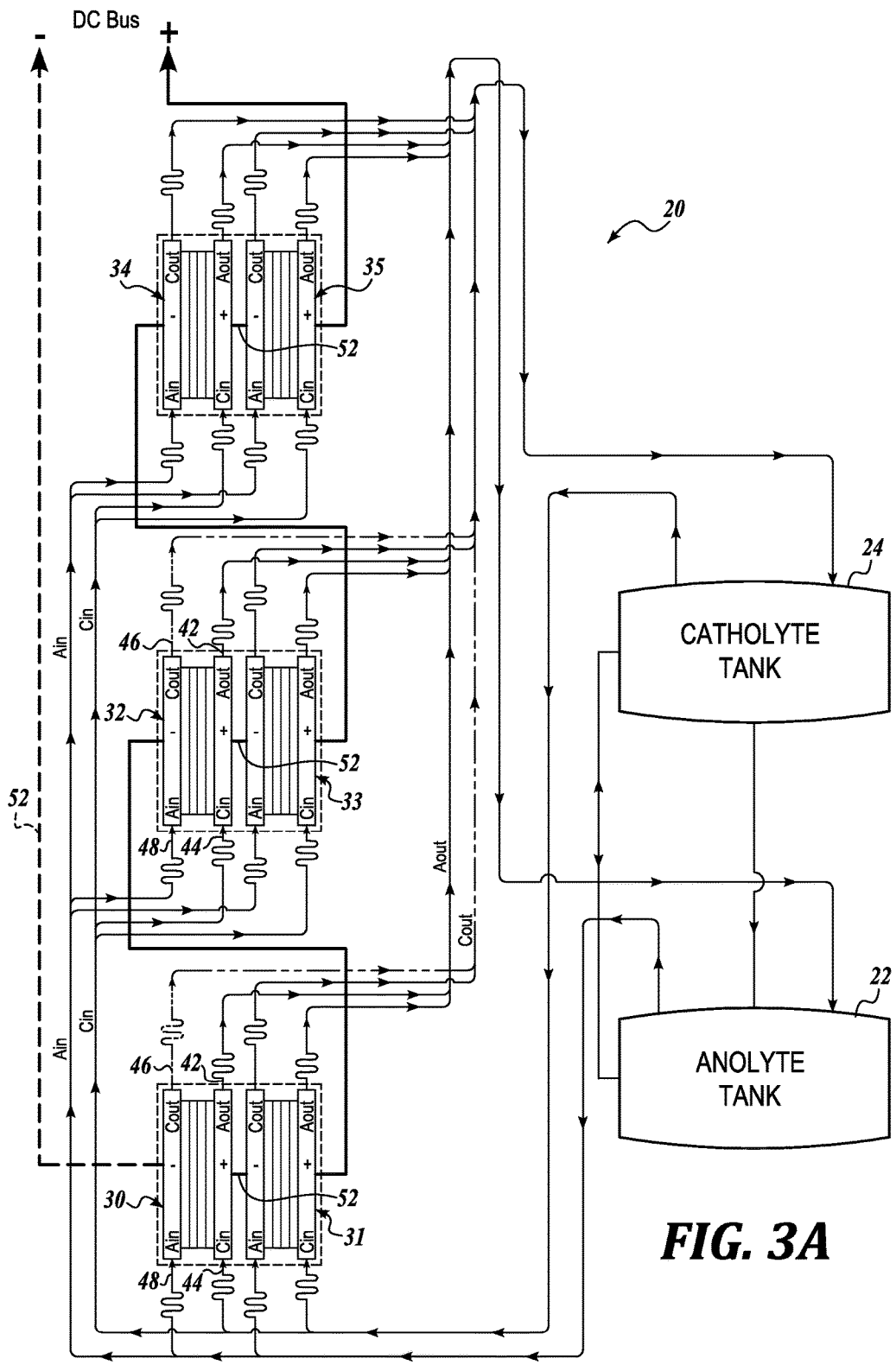
FIGS. 3A and 3B are schematic views of various components of the RFB module of FIGS. 1 and 2.
Figure 3B:
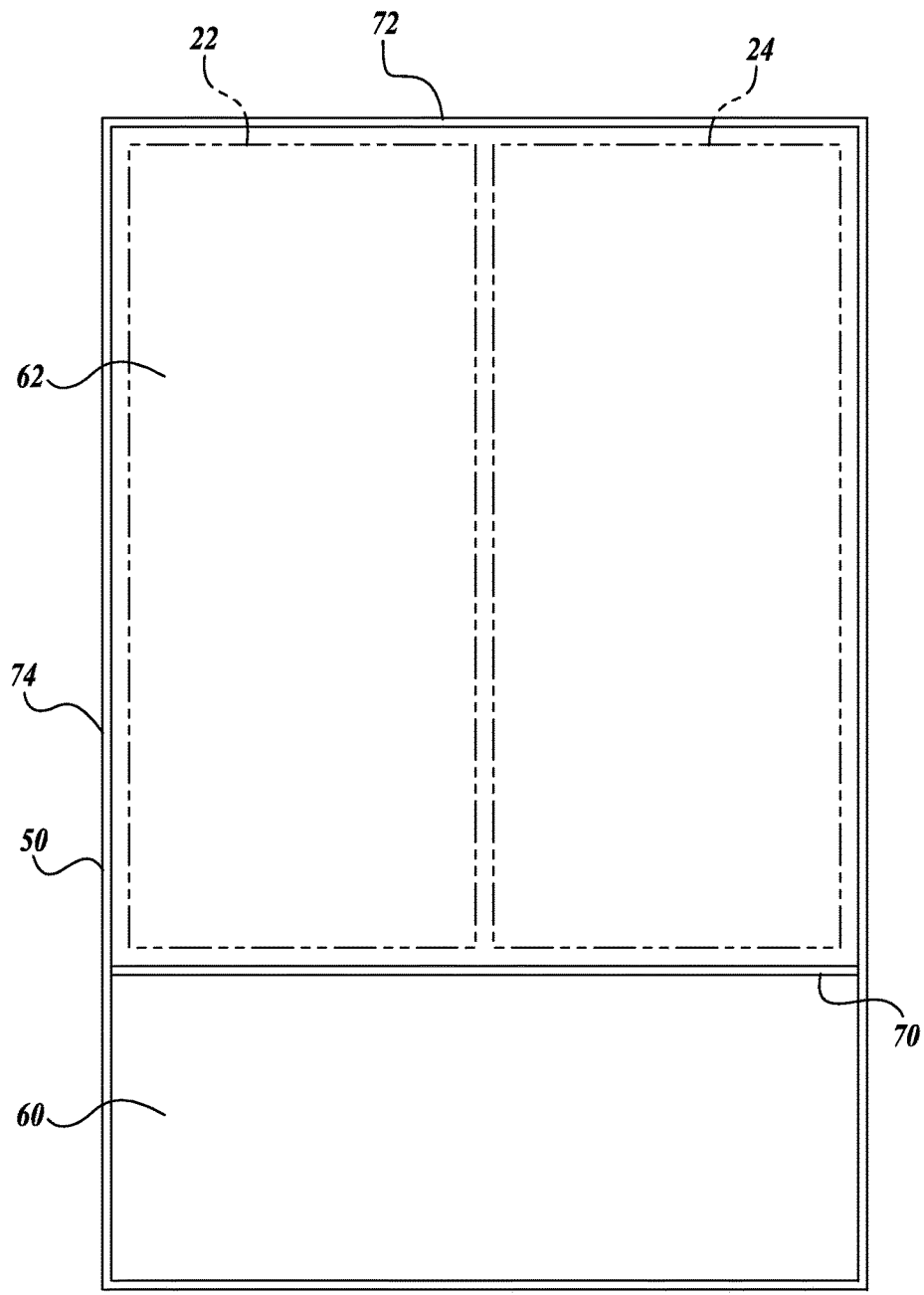

To obtain high voltage, high power systems, a plurality of single electrochemical cells may be assembled together in series to form a stack of electrochemical cells (referred to herein as a "stack," a "cell stack," or an "electrochemical cell stack"), e.g., 30 or 32 in FIG. 3A. Several cell stacks may then be further assembled together to form a battery system 20. A MW-level RFB system generally has a plurality of cell stacks, for example, with each cell stack having more than twenty electrochemical cells. As described for individual electrochemical cells, the stack is also arranged with positive and negative current collectors that cause electrons to flow through the cell stack generally along an axis normal to the ion transfer membranes and current collectors during electrochemical charge and discharge (see, e.g., line 52 shown in FIG. 3A).

The ion exchange membrane in each electrochemical cell prevents crossover of the active materials between the positive and negative electrolytes while supporting ion transport to complete the circuit. Ion exchange membrane material, in a non-limiting example, a perfluorinated membrane such as NAFION or GORE-SELECT, may be used in the electrochemical cells.

Ion exchange through the membrane ideally prevents the transport of active materials between the anolyte and catholyte. However, data obtained from operating vanadium redox batteries (VRBs) shows capacity fading over time when the system is operating without any capacity fading mitigation features as described herein. Such capacity fading may, at least in part, be attributed to some transport of vanadium ions across the membrane. Different vanadium cations in the system have different concentration diffusion coefficients and electric-migration coefficients for crossing over through the membrane. These differences contribute to an unbalanced vanadium transfer between anolyte and catholyte after multiple cycles of operation, which may result in a loss of energy storage capacity.

Other negative effects caused by the transport of vanadium ions across the membrane include precipitation, which may occur if the vanadium ion concentration in the catholyte continues to increase as a result of the net transfer of vanadium ions. Precipitate may form in the electrode stacks, which may result in degradation in the performance of the VRB system. As a non-limiting example, precipitation of $V^{5+}$ as $V_2O_5$ can occur in the catholyte (thereby decreasing the amount and/or the concentration and amount of $V^{5+}$ in the catholyte).

In addition to the transport of vanadium ions across the membrane and precipitation, other electrochemical side reactions may contribute to decreased performance in VRB systems. These reactions must also be addressed to maximize the capacity and service life of the system, while minimizing cost and service requirements for the life of the battery. For example, under some operating conditions, side reactions may produce excess hydrogen and chlorine gases in the headspaces of the anolyte and/or catholyte tanks. Other detrimental reactions may also occur when electrolyte is exposed to oxidizing agents such as oxygen. In one example, over time, the anolyte is susceptible to $V^{2+}$ oxidation by atmospheric oxygen that is introduced into the tank during maintenance, installation, or other operations (thereby decreasing the amount and/or concentration of $V^{2+}$). $V^{2+}$ can also be oxidized by $H^+$ if hydrogen is evolved at the anode (thereby decreasing the amount and/or concentration of $V^{2+}$ in the anolyte).

Described herein are systems and methods of operation designed for mitigating the capacity decaying effects described above to improve RFB performance on a battery, string, and site level. In general, these features can be described in terms of maintaining electrolyte stability by applying active and passive charge balancing, employing specific methods for analysis and adjustment of electrolyte composition, and process gas management.

String and Site Control System

Figure 6:
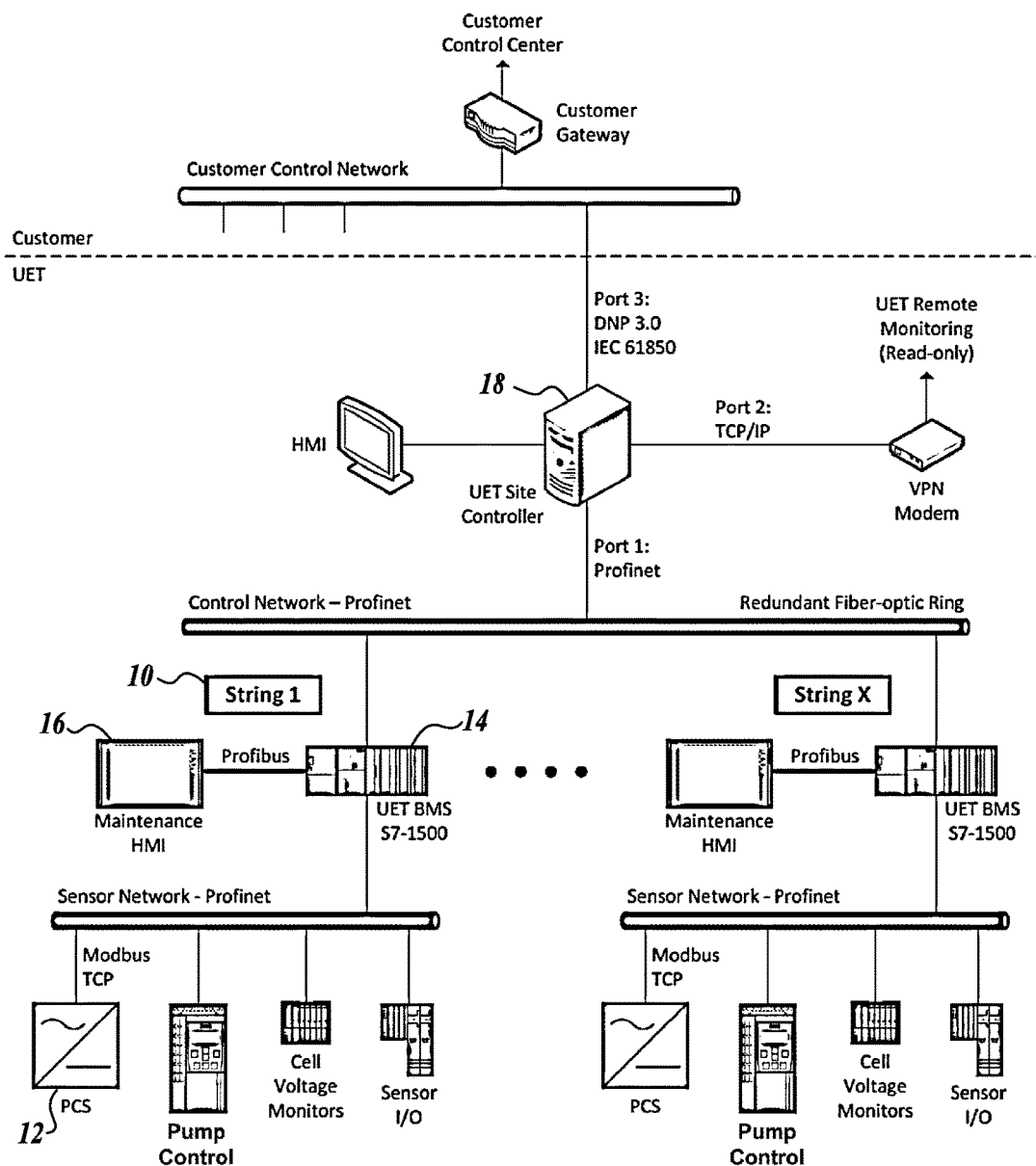
FIG. 6 is a control diagram for a site, for example, the sites of FIG. 4 or 5.

As noted above, a string 10 is a building block for a multiple MW site. As seen in the exemplary layouts in FIGS. 4 and 5, each string 10 includes four battery containers connected in series to a power and control system (PCS) 12 container. As can be seen in FIG. 6, the control system for each string includes a battery management system (BMS) 14 with local control provided by a human machine interface (HMI) 16. The BMS 14 interprets remote commands from the site controller 18, for example, a customer requirement to charge or discharge, as it simultaneously directs the appropriate operations for each battery and sub-component in the string 10 via a communication network. At the same time, according to programmed logic, the BMS 14 interprets string 10 operating data from the batteries 20, PCS, and their associated sub-components to evaluate service or diagnose maintenance requirements. See also FIG. 6 for string and site control diagrams.

As a non-limiting example, an exemplary VRB may have capacity up to 125 kW for four hours (500 kW-hours) and a storage string may have capacity up to 500 kW for four hours (2 MW-hours). To be effective as a large scale energy storage system that can be operated to provide multiple layered value streams, individual batteries, designed and manufactured to meet economies of scale, may be assembled as building blocks to form multiple-megawatt sites, for example 5 MW, 10 MW, 20 MW, 50 MW, or more. Managing these large installations requires multi-level control systems, performance monitoring, and implementation of various communications protocols.

Referring to FIG. 4, an exemplary 1 MW system layout shows two 500 kW building block sub-assemblies or strings 10 that each include four battery modules 20 and one PCS module 102. Using this approach, multi-level larger systems may be assembled, for example, the single-level 10 MW system shown in FIG. 5. As described in greater detail below, the unique combination of systems and components described herein provide significantly more energy density in a compact flowing electrolyte battery module 20 and string 10 design than previously designed flowing electrolyte batteries, such earlier generation VRBs. Other hybrid flowing electrolyte batteries, such as ZnBr2 systems, may demonstrate similar characteristics.

Battery Container System, Electrolyte Tank Assembly, and General Arrangement

Referring now to FIGS. 1 and 2 each RFB 20 includes a container 50 that houses the remaining components of the system in a substantially closed manner. These remaining components generally include the anolyte and catholyte tank assemblies 22 and 24, the stacks of electrochemical cells 30, 32, and 34, a system for circulating electrolyte 40, and an optional a gas management system 94. The configuration of each of these components will now be described in more detail.

FIG. 1 depicts the container 50 that houses, for example, the components shown in FIG. 2. The container 50 can be configured in some embodiments to be an integrated structure that facilitates or provides one or more of the following characteristics: compact design, ease of assembly, transport-ability, compact multiple-container arrangements and structures, accessibility for maintenance, and secondary containment.

In the illustrated embodiment of FIGS. 1 and 2, the representative container 50 comprises two major compartments that house components of the RFB 20. In some embodiments, the division between the first and second compartments 60 and 62 is a physical barrier in the form of a bulkhead 70 (see FIG. 3B), which may be a structural or non-structural divider. The bulkhead 70 in some embodiments can be configured to provide secondary containment of the electrolyte stored in tank assemblies 22 and 24. In another embodiment, a secondary structural or non-structural division can be employed to provide a physical barrier between the anolyte tank 22 and the catholyte tank 24. In either case, as will be described in more detail below, the tanks 22 and 24 are configured as so to be closely fitted within the compartment or compartments, thereby maximizing the storage volume of electrolyte within the container 50, which is directly proportional to the energy storage of the battery 20.

In some embodiments, the container 50 has a standard dimensioning of a 20 foot ISO shipping container. In one representative embodiment shown in FIGS. 1 and 2, the container has a length A which may be 20 feet, 8 feet in width B, and 9½ feet in height C, sometimes referred to as a High-Cube ISO shipping container. Other embodiments may employ ISO dimensioned shipping containers having either 8 feet or 8½ feet in height C, and in some embodiments, up to 53 feet in length A. In some of these embodiments, the container 50 can be additionally configured to meet ISO shipping container certification standards for registration and ease of transportation via rail, cargo ship, or other possible shipping channels. In other embodiments, the container may be similarly configured like an ISO shipping container. In other embodiments, the container has a length in the range of 10-53 feet and a height in the range of 7-10 feet.

The container 50 also includes various features to allow for the RFB 20 to be easily placed in service and maintained on site. For example, pass-through fittings are provided for passage of electrical cabling that transfers the power generated from circulation of the anolyte and the catholyte through the stacks of electrochemical cells. In some embodiments, the container 50 includes an access hatch 80, as shown in FIG. 1. Other hatches, doors, etc. (not shown) may be included for providing access to systems of the RFB 20.

Electrolyte Tank and Assembly

FIGS. 1 and 2 illustrate anolyte tank 22 and catholyte tank 24 positioned side by side in the second compartment 62. In the illustrated embodiment shown in FIGS. 1 and 2, the representative anolyte tank 22 is generally rectangular, with a shoulder or stepped section 90 located at the front upper corner of each tank 22 and 24.

The stepped section 90 provides access for an optional electrolyte transfer conduit 92 to provide fluid communication between the anolyte tank 22 and the catholyte tank 24 when the tanks are aligned side-by-side, as described in greater detail below. However, in accordance with other embodiments of the present disclosure, the tanks 22 and 24 need not be manufactured to include a stepped section 90 or may include another configuration to optionally accommodate either an electrolyte transfer conduit or another fluid transfer device between tanks 22 and 24.

In some embodiments, anolyte tank 22 and/or catholyte tank 24 are constructed from molded or fabricated plastic, fiberglass, or other materials or combinations of materials. Other materials may include various metals, glass, glass lined steel, tantalum, etc. In some embodiments, tanks 22 and/or 24 have a rigid construction. In some embodiments, the material comprising the walls of the tanks 22 and/or 24 are configured to flex outwardly when filled with electrolyte in order to contain the electrolyte therein. As such, the tanks in some embodiments can expand or contract to accommodate the expected range of changes in electrolyte volume or pressure during operation.

In some embodiments, anolyte tank 22 and/or catholyte tank 24 are constructed such that some portions of the tanks are more rigid to support equipment or other features attached to the tanks, while other portions of the tanks may retain flexibility as described above.

The catholyte tank 24 is configured substantially similar to the anolyte tank 22. In one embodiment of the present disclosure, the catholyte tank 24 has a smaller volume than the anolyte tank 22, as described in greater detail below. An optimized tank size ratio between the anolyte and catholyte tanks 22 and 24 provides a means to maintain maximum energy storage capacity of the RFB module 20 over multiple cycles. The difference in volume between the anolyte and catholyte tanks 22 and 24 can be realized via a larger width dimension, for example, of the anolyte tank 22, or the tanks can have identical outer dimensions but the catholyte tank 24 may include a cavity bottom that is higher than the floor of the tank or a filler material, such as an inert material, that takes up some of the volume of the tank. In other embodiments (not shown), the anolyte tank may have substantially the same volume as the catholyte tank or may have a smaller volume than the catholyte tank.

In some embodiments, the anolyte tank 22 and the catholyte tank 24 are configured so as to store a combined volume of electrolyte of about 20 cubic meters or greater. In one representative embodiment, the total combined volume is about 23 cubic meters or greater.

As shown in FIG. 2, the tanks 22 and 24 are sized to fit closely into the container 50. For example, the length of each tank 22 and 24 is such that they abut against a front bulkhead 70 at one end (see FIG. 4) and against a container back wall 72 at their opposite end (see FIGS. 1 and 4). Therefore, the back wall 72 of the container 50 supports the back of the tanks 22 and 24, and the front bulkhead 70 installed, for example, after tank installation supports the front of the tanks 22 and 24. Similarly, the height of each tank 22 and 24 is that that the tanks are supported by the side walls 74, extending from the bottom wall 76 of the container 50 and extend upwardly to just proximal the top wall 78 (see FIG. 1).

In one embodiment of the present disclosure, the anolyte tank and the catholyte tank are configured to extend between the bulkhead and a first end wall that define the first compartment so as to be adjacent or abut against the bulkhead and the end wall. In another embodiment, the area defined by lengthwise sidewalls and widthwise side walls of the anolyte tank and the catholyte tank fills at least 85% of the area defined by the anolyte and catholyte tank compartments.

To increase rigidity and strength of the container 50, and to withstand additional side loading imparted by the electrolyte in the tanks 22 and 24, the vertically disposed side wall walls 74 can be reinforced. Other walls may also be reinforced or constructed with increased strength. For example, the back wall 72 can also be reinforced and the bottom wall 76 can be constructed with thicker steel or multiple steel plates in order to support the weight of the electrolyte. It will be appreciated that the bulkhead 70 also provides for increased rigidity of the container. In one embodiment, the container 50 has a unibody construction. The structural support provided by the container 50 when the tanks 20 and 24 are filled with electrolyte allows for the tanks 22 and 24 to be manufactured similarly to bladders that have minimal inherent self-supporting structure To reduce the possibility of an electrolyte leak from the tanks 22 and 24, penetrations into the tanks 22 and 24 below the level of the liquid stored are minimized. In the illustrated embodiment, there is one penetration into each tank 22 and 24 slightly below the liquid level to accommodate electrolyte transfer conduit 92. As described in greater detail below, the electrolyte transfer conduit 92 is positioned near the top of each tank 22 and 24, and there is a well 172 to control any leak that may occur at the joints between the conduit 92 and the tanks 22 and 24 (see FIG. 13).

In the event of a leak of electrolyte in the RFB module 20, the container 50 is manufactured to provide secondary electrolyte containment. In that regard, the container may be manufactured from steel or another suitable metal or another suitable material, and all seams are fully welded or sealed to provide secondary leak containment.

Pump Tub (Electrolyte Tank Sub-Assembly)

To maximize the size and liquid fill level of the tanks 22 and 24, while also avoiding leak concerns due to penetrations below the liquid level, a low-profile pump tub assembly 120 can be employed in accordance with aspects of the present disclosure. When installed, as will be described in more detail below, the pump tub assembly 120 provides electrolyte suction and discharge access below the tank liquid level, while keeping liquid connections physically located above the tank liquid level. The pump tub assembly 120 can also be equipped with leak sensors (not shown). The tub is located such that a lower portion of the cavity is located below the liquid level in the tank and an upper portion of the cavity is located at or above the liquid level in the tank.

Figure 7:
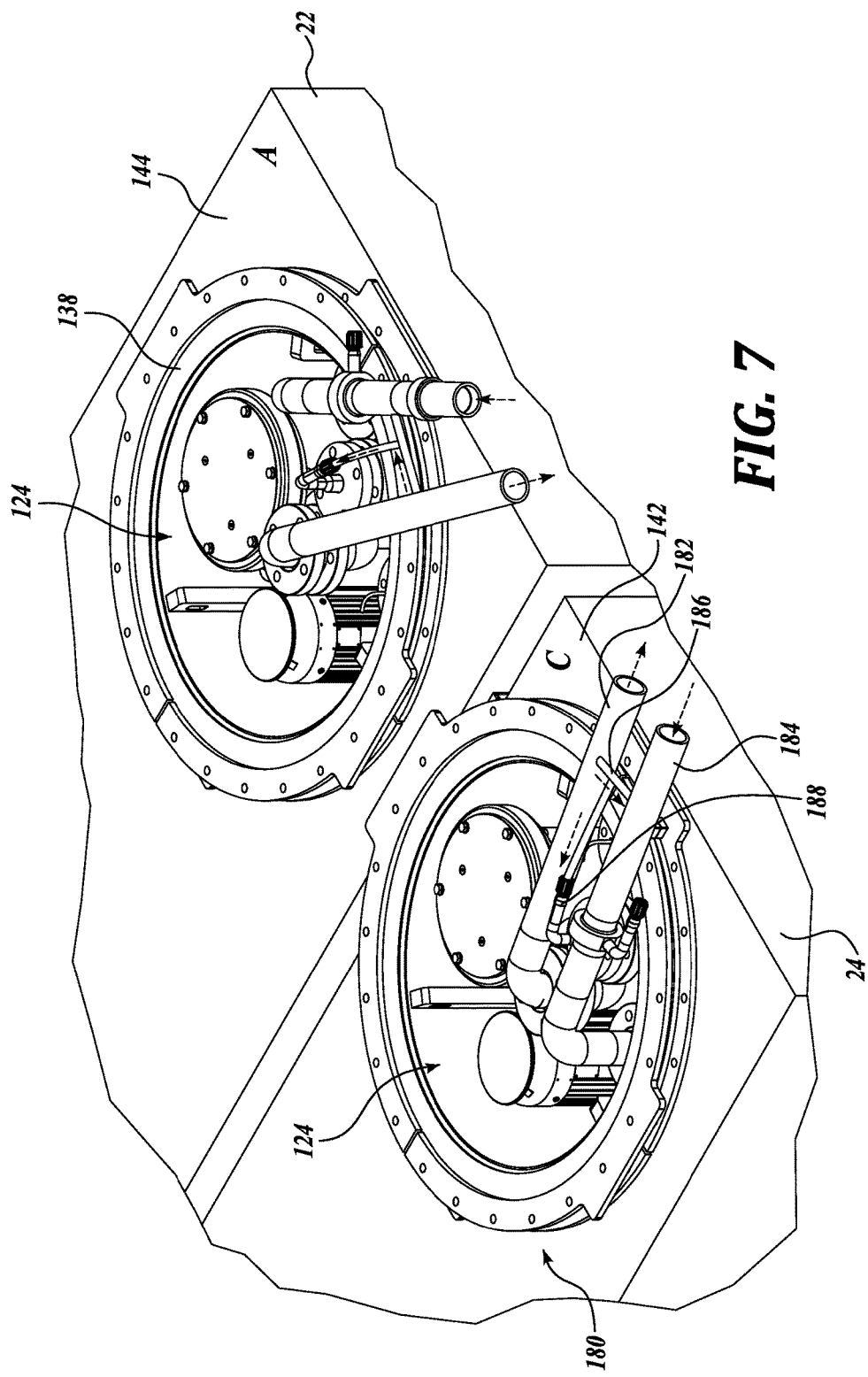
FIG. 7 is a close-up isometric view of pump tub assemblies shown in the RFB module of FIGS. 1 and 2 positioned on the top walls of the respective anolyte and catholyte tanks.
Figure 8:
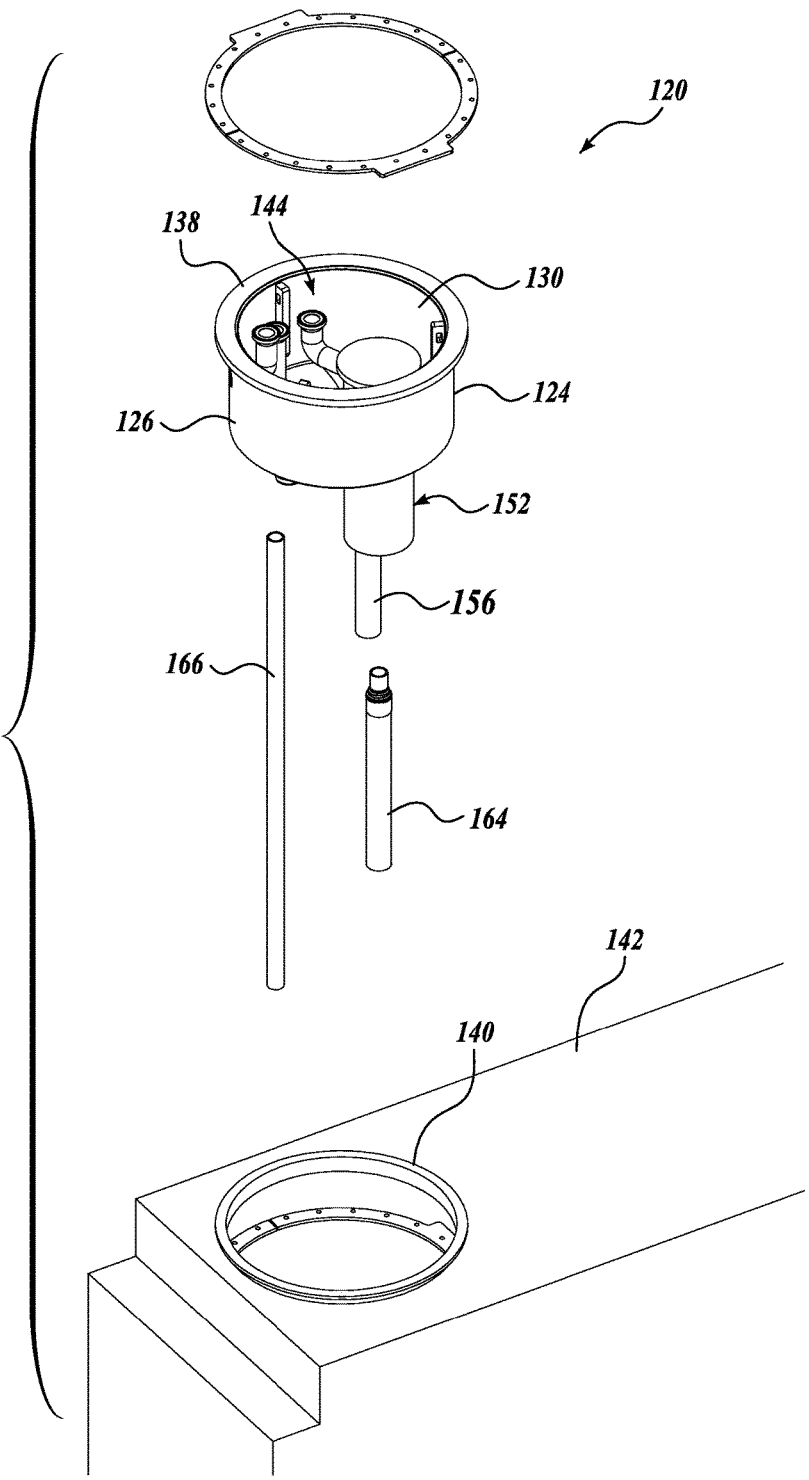
FIG. 8 is an exploded view of one pump tub assembly of FIG. 7.
Figure 11:
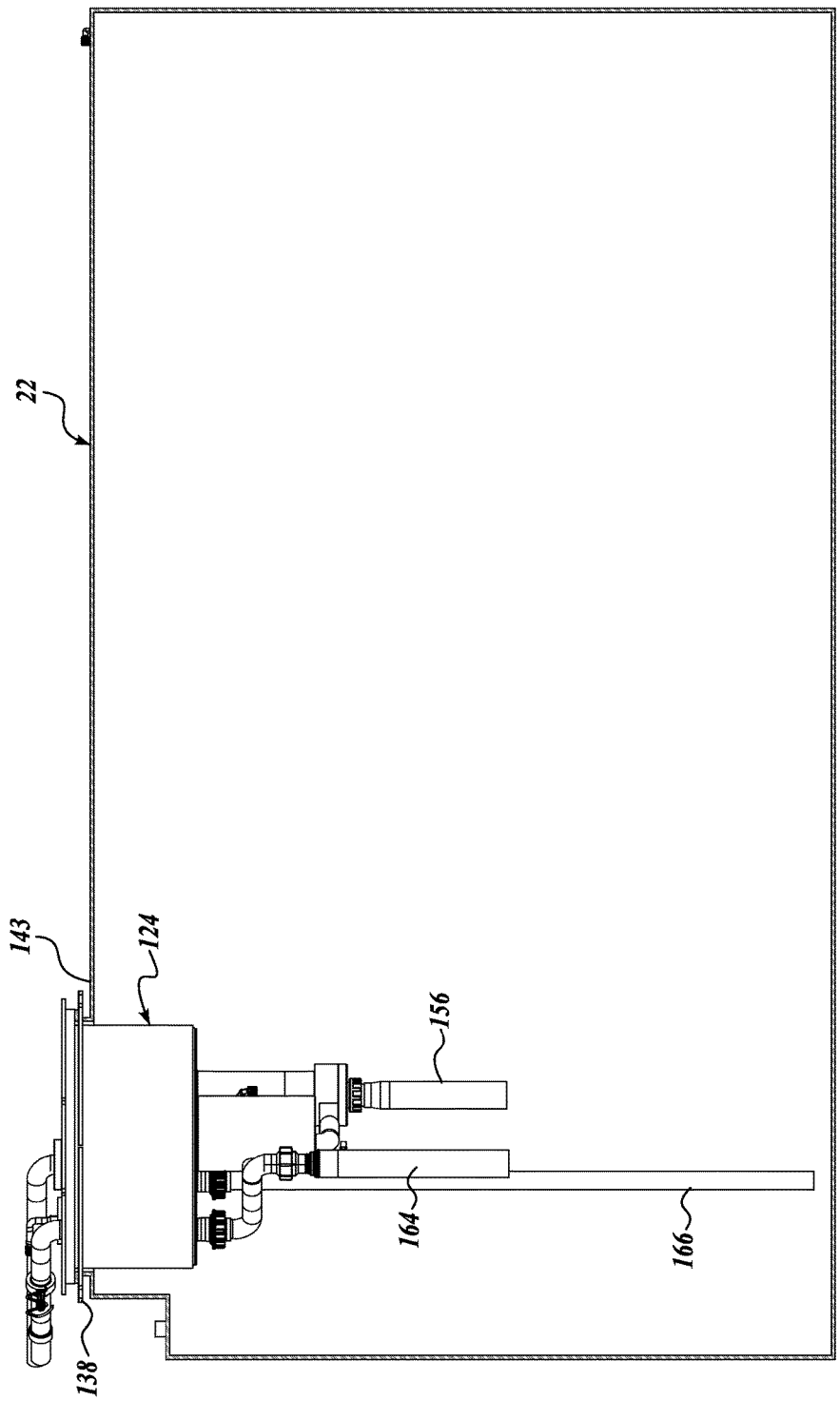
FIG. 11 is a cross-sectional side view of a tank showing a pump tub assembly inserted into the tank.

Referring to FIGS. 1 and 2, the pump tub assembly 120 is disposed at the forward section of the top wall 78 of each tank 22 and 24. Referring now to FIGS. 7 11, the pump tub assembly 120 will be described in greater detail. As can be seen in the illustrated embodiment of FIG. 8, the pump tub assembly 120 includes a tub 124 that is generally cylindrical, although other shapes may be utilized. The tub 124 includes a contiguous, cylindrical sidewall 126 that extends from a bottom wall 128 upwardly to an upper edge, thereby delimiting an open-ended cavity 130. The cavity 130 is configured to house various piping connections interfaces and optional filters, etc. In the illustrated embodiment, the tub assembly also houses a pump and a filter. In other embodiments, the pump, filter, or other components may be located in another location in the system, for example, in the first compartment 60.

At the opening to the cavity 130, the tub 124 includes a laterally outwardly extending flange 138 that extends the entire perimeter of the tub sidewall 126. When assembled, the tub 124 is inserted into a cooperatingly configured opening 140 in the top wall 142 of each tank 22 or 24 and placed such that the flange 138 abuts the top wall 142. Once mounted as part of the tank container system described above, the pump tub provides a high electrolyte fill level, low equipment profile, no tank penetrations for electrolyte circulation below the liquid level and in some embodiments moves the pumps, filters, and associated equipment out of the space in front of the tanks to make it available for balance of plant (BOP) components that comprise electrical systems, stacks, electrolyte manifold distribution systems, and air handling systems. Compared to existing VRB systems, maximized electrolyte tank volume and BOP space provided by the tank/pump/container system result in an increase in energy density in the battery unit 20.

It will be appreciated that an O-ring or other type of sealing device 136 can be disposed between the flange 138 of the tub 124 and the top wall 142, if desired (see FIG. 11). Any suitable fastening technique can be employed to couple the tub to the tanks 22 and 24 in a substantially sealed and leak proof manner.

Figure 32:
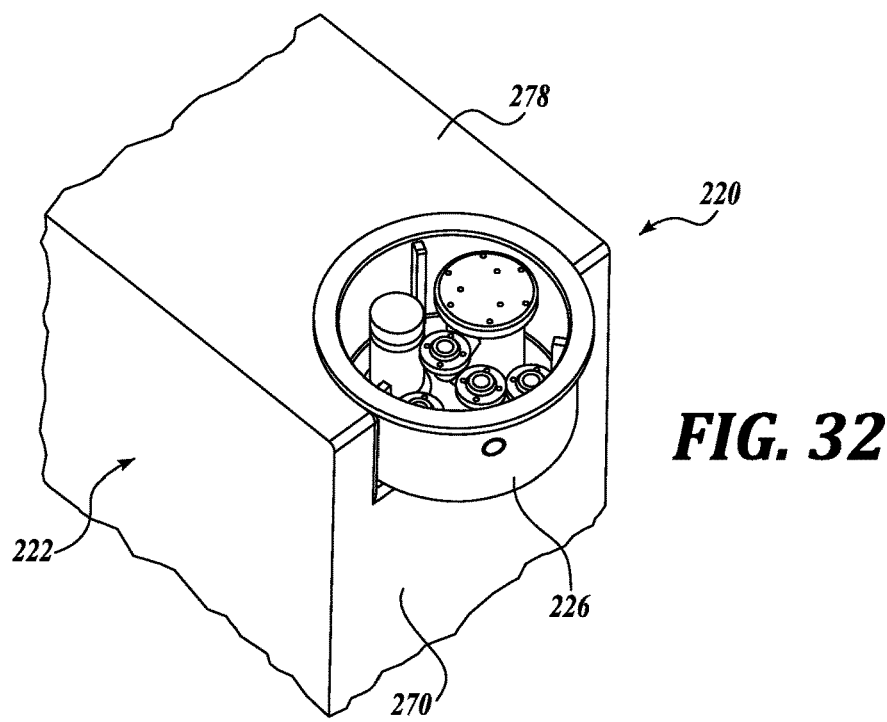
FIGS. 32 and 33 are isometric view of pump tub assemblies in accordance with other embodiments of the present disclosure.
Figure 33:
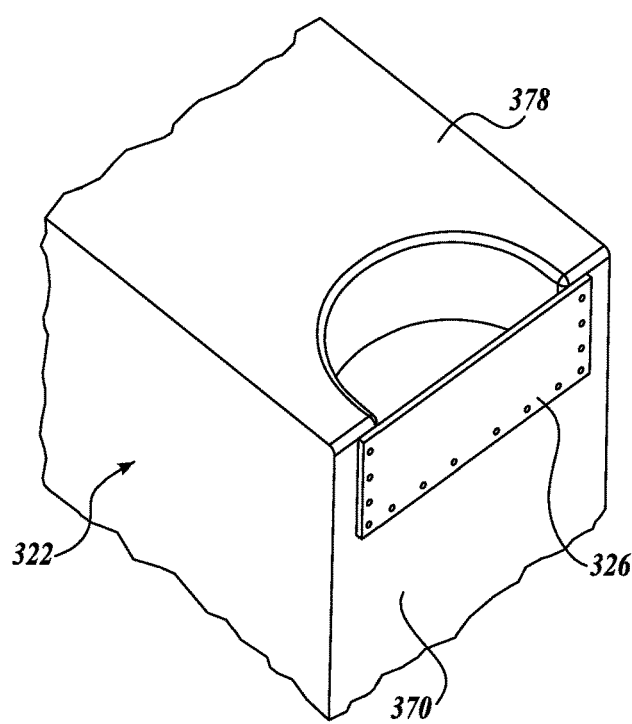

Now referring to FIGS. 32 and 33, pump tub assemblies in accordance with other embodiments of the present disclosure will be described in more detail. The pump tub assemblies 220 and 320 of FIGS. 32 and 33 are substantially identical in materials and operation as the previously described embodiment, except for differences regarding the location of the pump tub relative to the housing, which will be described in greater detail below. For clarity in the ensuing descriptions, numeral references of like elements of the pump tub assembly 120 are similar, but are in the 200 and 300 series for the respective illustrated embodiments of FIGS. 32 and 33.

Referring to FIG. 32, the pump tub assembly 220 includes a tub sidewall 226 that intersects with the top tank wall 278 and one or more tank side walls 270. Such configuration allows for front access to the pump tub assembly 220, as compared to only top access in the previously described embodiment (see FIG. 1).

The tub is located such that a lower portion of the cavity is located below the liquid level in the tank and an upper portion of the cavity is located at or above the liquid level in the tank. The tub may be a discreet tub attached to a tank, or may include a plurality of components that are sealably attached to each other and to the tank.

Referring to FIG. 33, the pump tub assembly 320 includes a tub sidewall 326 that, like the pump tub assembly 320 of FIG. 32, also intersects with the top tank wall 378 and one or more tank side walls 370. However, the pump tub assembly 320 is semi-circular in cross-section and the front portion 326 of the pump tub assembly 320 is flush with the front wall 370 of the tank 322. In this design, the front portion 326 of the pump tub assembly 320 does not extend beyond the front wall 370 of the tank 322. Like the pump tub assembly 220 of FIG. 32, such configuration allows for front access to the pump tub assembly 320.

In both of the illustrated embodiments of FIGS. 32 and 33, the sides and top of the pump tub assemblies 220 and 320 can be sealed to the tank by welding, with gaskets, or other common sealing techniques. Also, in both embodiments, all or part of the pump tub assemblies 220 and 320 shown in FIGS. 32 and 33 may be molded into the tanks. In either embodiment, any portions of the molded tub that are below the tank liquid level can be provided with leak containment by installing an additional sealing body that can be sealed to the tank by welding, with gaskets, or other common sealing techniques.

In one embodiment of the present disclosure, a fluid connection point includes at least one of a pipe, pipe fitting, tube, tube fitting, pump, and filter, configured to conduct fluid between the storage tank and another device or system that is external to the storage tank envelope.

In another embodiment, a fluid connection point includes at least one of a pipe, pipe fitting, tube, tube fitting, pump, and filter configured to conduct gas between the storage tank and another device or system that is external to the storage tank envelope.

Electrolyte Circulation System

As described above regarding the general operation of a RFB 20, an electrolyte circulating system 40 is provided for circulating the anolyte and the catholyte from respective tanks 22 and 24 into the stacks of electrochemical cells 30, 32, and 34 (see FIG. 2). In that regard, discharge and return conduits/piping for each tank 22 and 24 are suitably connected from/to the stacks of electrochemical cells 30, 32, and 34, as shown in FIGS. 2, 3 and 7. In some embodiments, a shunt current suppression system may be employed by the circulation system 40 for the anolyte circuit and/or the catholyte circuit, as set forth in co-pending U.S. patent application Ser. No. 14/217,077, filed Mar. 17, 2014, the disclosure of which is incorporated by reference herein in its entirety. In the illustrated embodiment, the shunt current suppression system includes looping or coiled tubing 88 to maximize the travel path of the electrolyte (and effectively minimize shunt currents) while keeping pumping losses to a minimum in a compact space.

Figure 9:
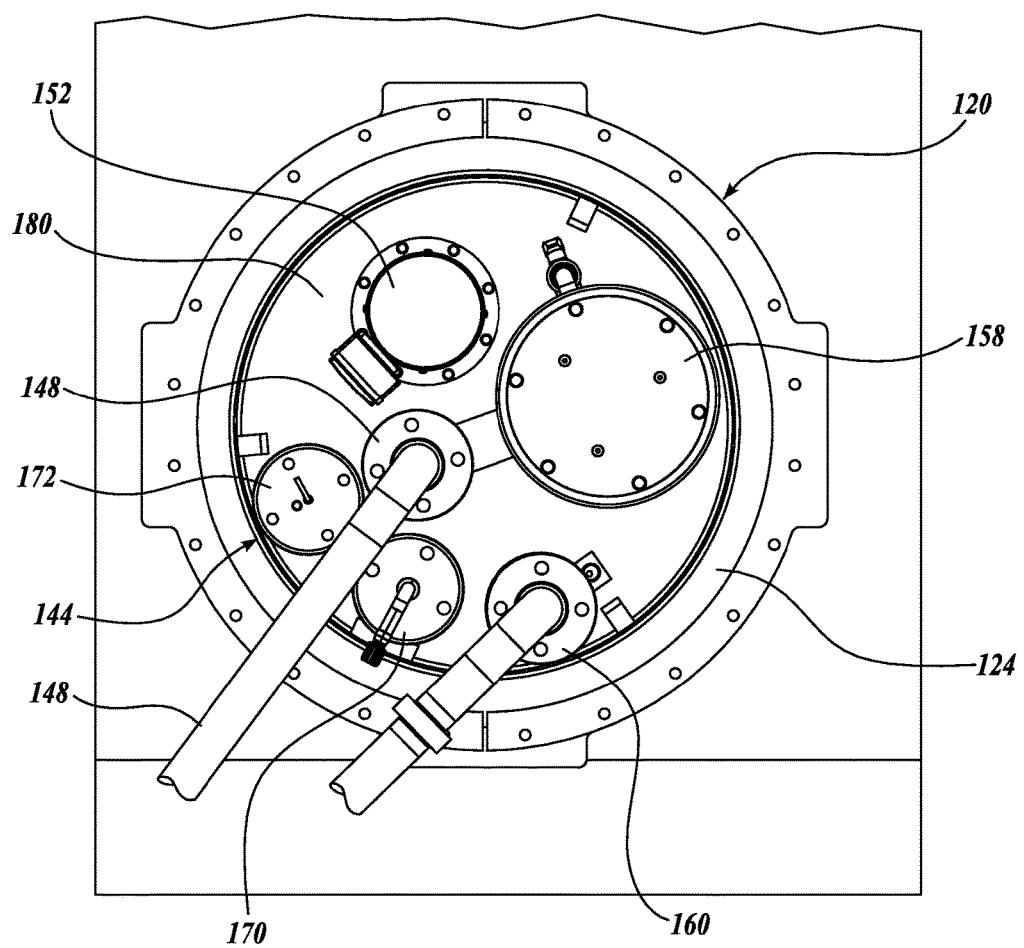
FIG. 9 is a top view of one pump tub assembly of FIG. 7.
Figure 10:
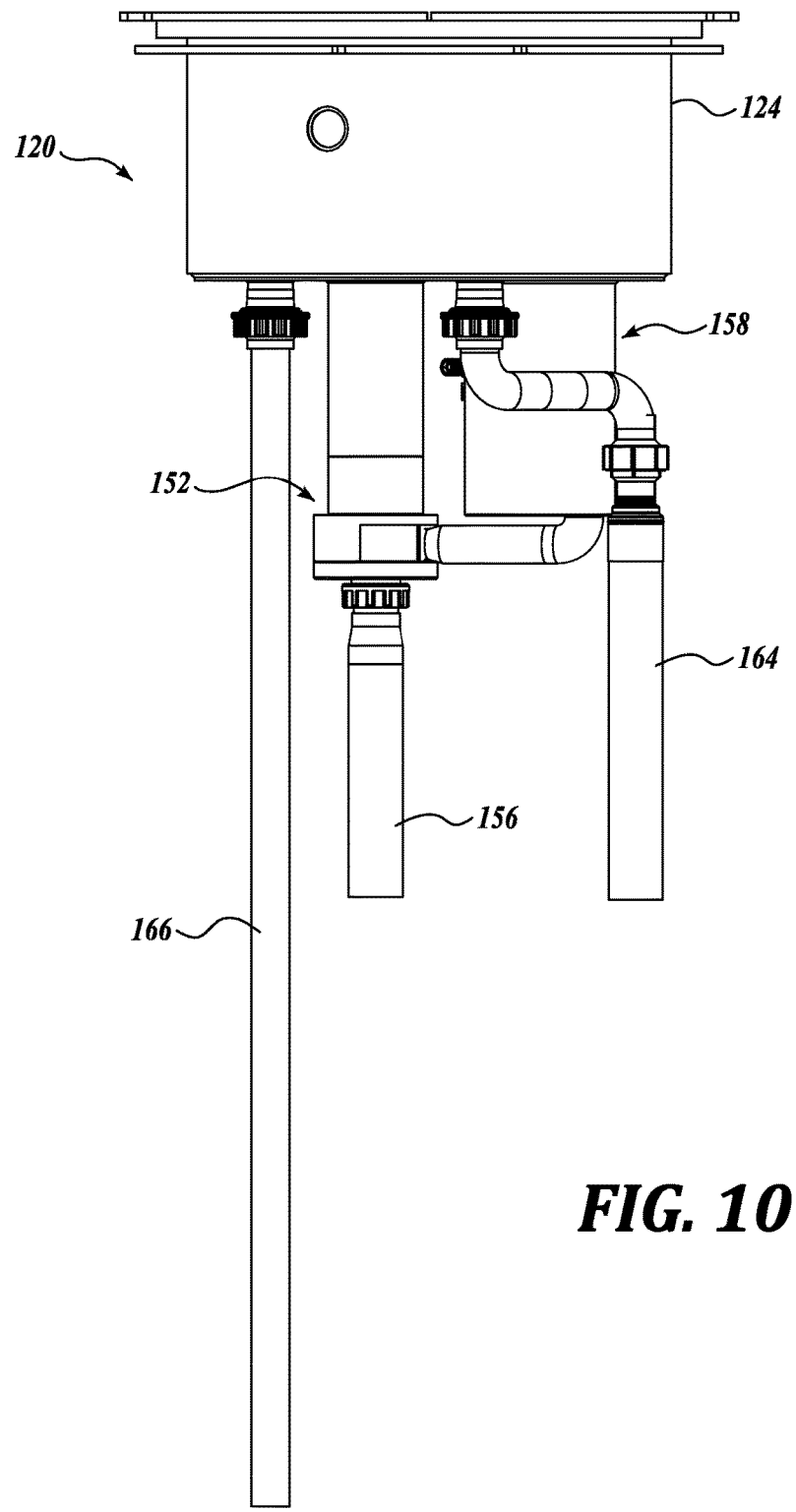
FIG. 10 is a side view of one pump tub assembly of FIG. 7.

As shown in FIGS. 2, 9 and 10, each pump tub assembly 120 includes a piping interface 144 for coupling the tanks 22 and 24 in fluid communication with the return and discharge piping of the circulating system 40. For example, in the embodiment shown (see FIG. 9), the piping interface 144 includes a discharge connector 148 in the form of a flanged pipe connected to the interior of the tank via a motor driven pump 152 and a suction tube 156 that extends downward into the electrolyte (see FIG. 10). The piping interface 144 also includes a return connector 160 in the form of a flanged pipe connected to the interior of the tank (see FIG. 9) via an elongated down tube 164 (see FIG. 10). In the embodiment shown, an optional filter 158 can be suitably interconnected between the discharge connector 148 and the pump 152 (see FIG. 10).

The piping interface 144 may also include a third connector 170 in the pump tub assembly 120 for providing the gas pressure management system 96 access to the head space 178, as will be described in greater detail below. Other interfaces may also be provided, including a fill connector 172 adapted to be connected to a fill tube 166 positioned in the respective tank. It will be appreciated that all penetrations through the bottom or side wall of the tub are both substantially sealed and above the tank liquid level.

Figure 12:
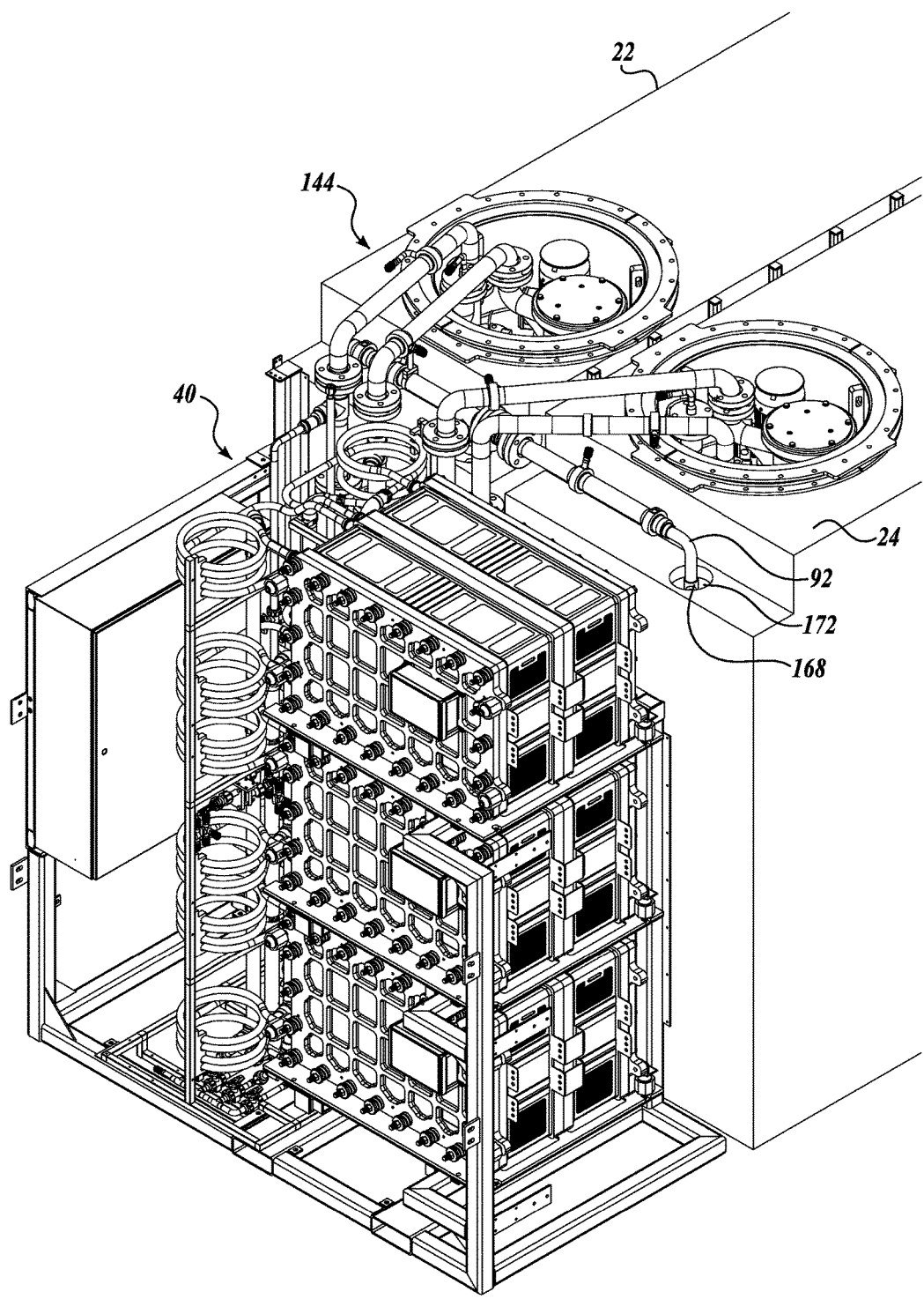
FIGS. 12 and 13 are isometric views of an electrolyte transfer conduit shown in the RFB module of FIGS. 1 and 2.

As described in greater detail below with reference to FIGS. 12-14, the RFB module 20 may further include an optional electrolyte transfer conduit 92 allowing fluid exchange between the catholyte and anolyte tanks 24 and 22 and an optional gas management system 94 for managing evolving gases from the catholyte and anolyte and gas pressure in the headspaces during operation (see FIG. 13). Both of these elements are part of systems that can be used to maintain the energy density and capacity of the RFB module 20, and reduce periodic maintenance.

Electrolyte Stability and Capacity Management

As described previously, during normal charge/discharge operations without corrective action, a decrease in charge capacity may be experienced in VRB systems. Exemplary test data was sampled during 110 continuous charge/discharge cycles, and plotted as a function of the number of cycles on a representative 31.5 kW stack. The data in FIGS. 15-19 illustrate the following: electrolyte volume change during cycling (FIG. 15); electrolyte total vanadium change during cycling (FIG. 16); electrolyte active available material change during cycling (FIG. 17); electrolyte concentration change during cycling (FIG. 18); and electrolyte capacity fading during cycling (FIG. 19), each described in greater detail below.

Example 1

Electrolyte Volume Change

Figure 15:
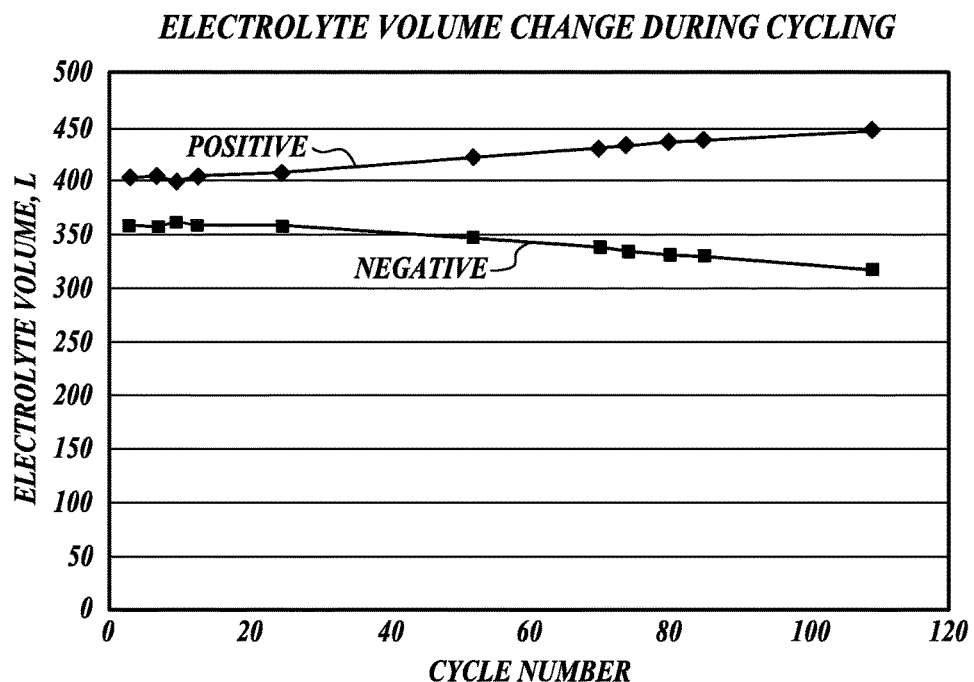
FIGS. 15-21 are graphical depictions of data regarding electrolyte stability and capacity management in an exemplary vanadium RFB system.

Referring to FIG. 15, catholyte volume increased approximately 50 liters over 110 cycles, while at the same time the anolyte volume decreased approximately 50 liters over the same number of operating cycles. Volume ratio change continued to diverge at approximately the same rate during the course of testing. No stabilization was observed.

Example 2

Electrolyte Total Vanadium Change

Figure 16:
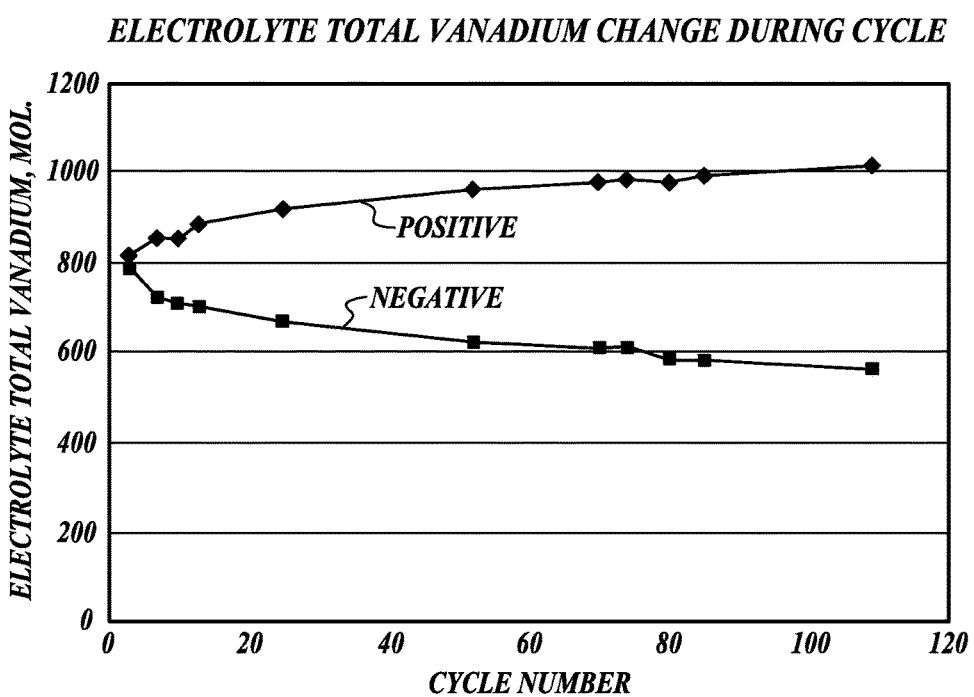

Referring to FIG. 16, the number of moles of vanadium in the catholyte increased from approximately 800 to 1010 over 110 cycles, while at the same time, the number of moles of vanadium in the anolyte decreased from approximately 800 to 560 over the same number of operating cycles. Although the total vanadium rate of change decreased over time, it still continued to diverge at the end of testing. No stabilization was observed.

Example 3

Electrolyte Active Available Material Change

Figure 17:
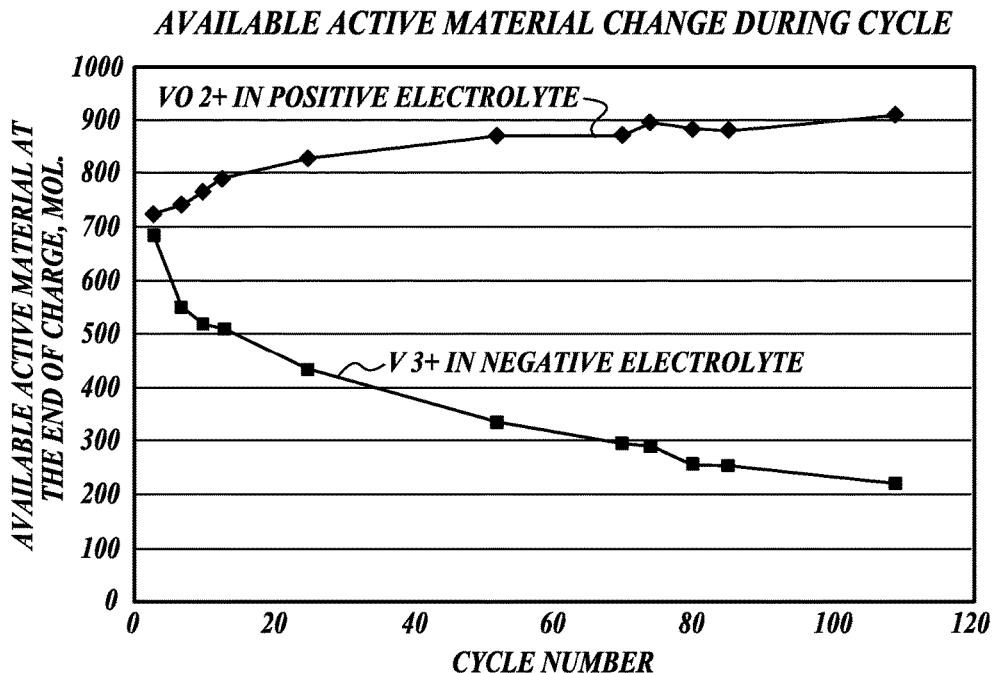

Referring to FIG. 17, the number of moles of vanadium active materials ($VO^{2+}$) in the catholyte increased from approximately 700 to 900 over 110 cycles, while at the same time, the number of moles of vanadium active materials ($V^{3+}$) in the anolyte decreased from approximately 700 to 220 over the same number of operating cycles. The active available material rate of change in the catholyte tank decreased over time, but still continued to diverge at the end of testing. The active available material rate of change in the anolyte tank continued to decrease at a high rate at the end of testing, and was the limiting factor in determining the energy storage capacity of the battery. No stabilization was observed.

Example 4

Electrolyte Concentration Change

Figure 18:
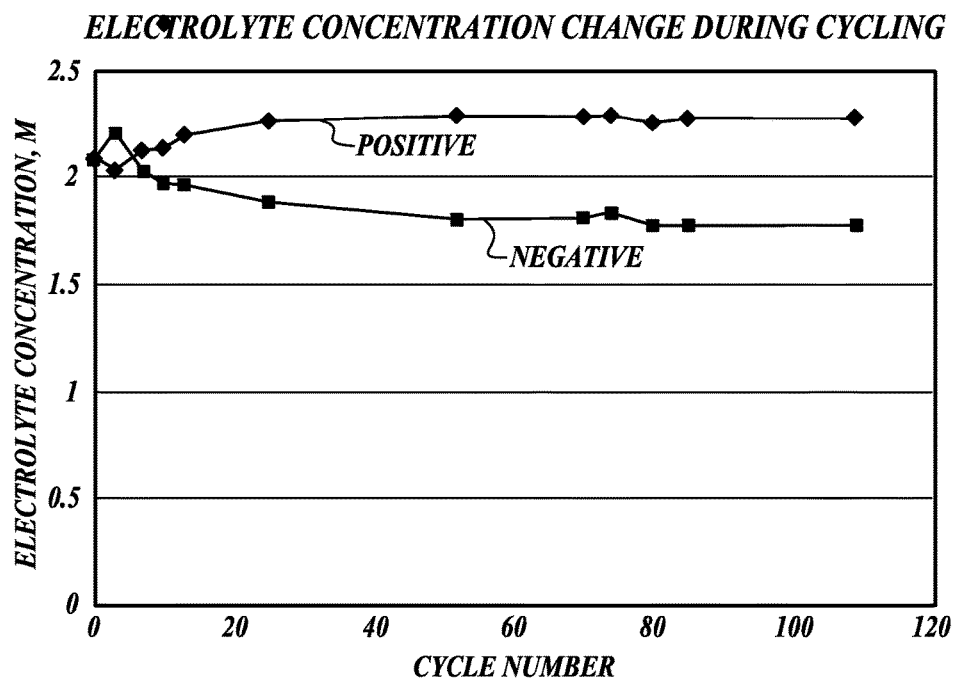

Referring to FIG. 18, the molar concentration of the positive electrolyte (catholyte) increased from approximately 2.1M to 2.3M over the first 20 cycles, and then stabilized at approximately that concentration for the remaining cycles. At the same time, the negative electrolyte (anolyte) decreased from approximately 2.1M to 1.8M over the first 20 cycles, and then stabilized at approximately that concentration for the remaining cycles. This demonstrated relationship illustrates an inherent VRB characteristic that provides insight into preferred volume ratios between the anolyte and catholyte tanks. In this example, the ratio is approximately 1.25:1.

Example 5

Electrolyte Capacity Fading

Figure 19:
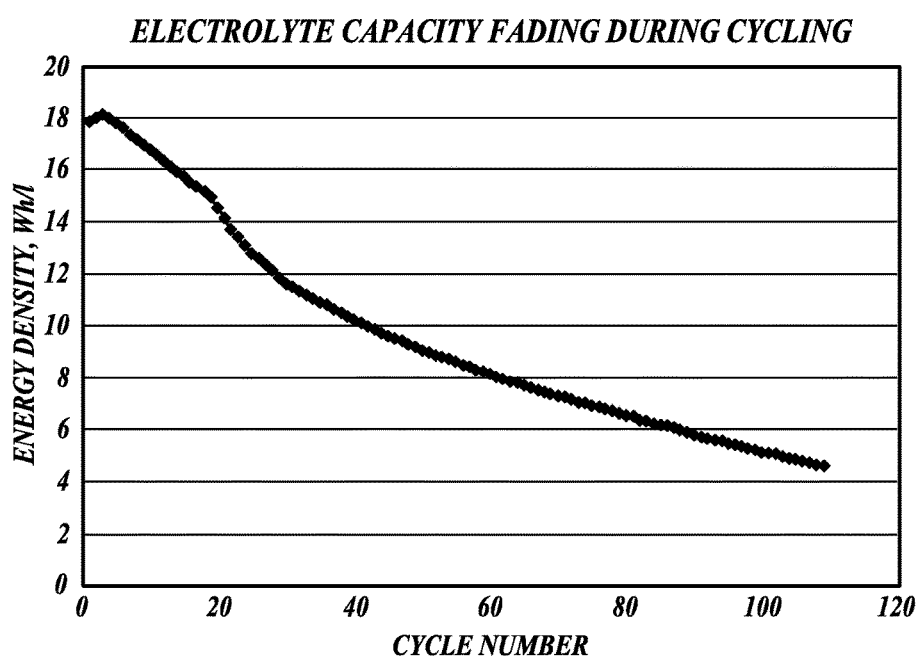

Referring to FIG. 19, the total energy capacity of the electrolyte in Watt-hours/liter, without any mitigating designs or procedures in place, shows a decrease for an initial value of 18 to a value of 4.5 after 110 cycles, reflecting information shown in the previous plots.

Electrolyte Adjustments for Managing Energy Storage Capacity

As described previously, and as can be seen in FIG. 18, the relationship between electrolyte concentration in the anolyte and catholyte tanks generally remains constant after the initial start-up phase; however at the same time, as can be seen in FIGS. 15 and 17, due to the inherent chemical reactions, nature of the cell structure, and other factors, the volume and active materials in the anolyte and catholyte tanks change as cycle numbers increase. As described previously, and as can be seen in FIG. 19, without mitigation, the battery energy capacity degrades over time as the result of limited availability of active material in the anolyte tank. Therefore, a system that maintains a specific electrolyte concentration ratio between the anolyte and catholyte tanks and/or maximizes the available active materials for energy storage and dispatch is described herein.

Electrolyte Volume Ratio

In one embodiment of the present disclosure, a method of operating a redox flow battery includes having a uniform or non-uniform predetermined volume ratio, based on maintaining a preferred electrolyte concentration, between the quantity of anolyte and the quantity of catholyte in the system. In the case of non-uniform predetermined volume ratio, the quantity or volume of anolyte may be more or less than the quantity or volume of the catholyte. The predetermined starting volume ratio may be different from or the same as the predetermined volume ratio during operation. Moreover, the predetermined volume ratio during operation may change subject to other conditions in the system.

As non-limiting examples, the tank volume ratio may have an anolyte volume to catholyte volume ratio of about 1:1.05 to about 1:1.50, about 1:1.15 to about 1:1.35, or about 1:1.20 to about 1:1.30. As a non-limiting example, in the illustrated embodiment of FIG. 2, the tank volume ratio between the anolyte tank and the catholyte tank is about 1.25:1.

As other non-limiting examples, the tank volume ratio may have a catholyte volume to anolyte volume ratio of about 1:1.05 to about 1:1.50, about 1:1.15 to about 1:1.35, or about 1:1.20 to about 1:1.30.

A non-uniform tank volume ratio may be achieved by having two different tank dimensions. For example, see the tank dimensions in the illustrated embodiment of FIG. 2. In that regard, the catholyte and anolyte tanks have similar heights and length dimensions, but different width dimensions (see schematic view in FIG. 14A). In another embodiment, the tanks may have different depths. For example, see the tank dimensions in the alternate embodiment of FIG. 14B. In that regard, the catholyte and anolyte tanks 224 and 222 have similar height, width, and length dimensions, but different depths dimensions. In other embodiments, the tanks may be partially filled with non-reacting materials to reduce some of the tank volume, or the tank may have a changeable volume to account for changes in the operation of the system (see alternate embodiment of FIG. 14C).

As described above, a non-uniform tank volume ratio based on maintaining a preferred electrolyte concentration between the anolyte and catholyte tanks can improve the energy density achieved during operation of the RFB module 20 having a given capacity for holding a certain amount of electrolyte. As a non-limiting example, a tank volume ratio of about 1.25:1 between the anolyte tank and the catholyte tank in the illustrated embodiment of FIG. 2 achieves greater energy density for the same total amount of electrolyte as compared to a uniform tank volume ratio between the anolyte and catholyte tanks. In addition, the inventors have found an advantageous effect of a non-uniform tank volume ratio that maintains a preferred electrolyte concentration, such as a ratio of about 1.25:1 between the anolyte tank and the catholyte tank in the illustrated embodiment of FIG. 2, maintains improved energy density over time than tanks of uniform size. Greater energy density is a result of greater availability and utilization of the active species in the electrolyte. In other types of modules, for example, in non-vanadium RFB systems, a preferable tank volume ratio may vary from the preferred range for a VRB system, and for example, may have a greater volume of catholyte compared to anolyte.

Electrolyte Transfer

In accordance with one embodiment of the present disclosure, the RFB 20 has a predetermined volume ratio, based on maintaining a preferred electrolyte concentration, in accordance with the volume ratios of catholyte and anolyte, as described above. Over a period of time of normal operation of the redox flow battery, the volume ratio of the anolyte and the catholyte may become greater than or less than the predetermined volume ratio. For example, as can be seen in the exemplary data of FIG. 15, in one mode of operation, a VRB system gains catholyte volume and loses anolyte volume over long-term cycling.

Therefore, in accordance with embodiments of the present disclosure, a volume of catholyte from the catholyte storage tank 24 to the anolyte storage tank 22, or a volume of anolyte from the anolyte storage tank 22 to the catholyte storage tank 24, to restore the volume ratio to the predetermined volume ratio. In the exemplary system of FIG. 15, excess catholyte generated from the system would need to flow from the catholyte tank 24 to the anolyte tank 22 to correct the volume imbalance.

Such transfer may be affected by passive electrolyte transfer, active electrolyte transfer, or a combination of passive and active electrolyte transfer, all described in greater detail below.

Passive Transfer of Electrolyte

In one embodiment of the present disclosure, a passive mechanical arrangement allows for the transfer of electrolyte between the anolyte and catholyte tanks. The transfer may be from anolyte tank 22 to catholyte tank 24 or from catholyte tank 24 to anolyte tank 22.

In the illustrated embodiment of FIGS. 1 and 2, the passive transfer system is a tank electrolyte transfer conduit 92. Referring to a simplified schematic in FIG. 14, and the RFB module 20 views in FIGS. 11-13, the electrolyte transfer conduit 92 is located at an overflow level in either the catholyte or anolyte tank 22 or 24. As discussed above, a stepped section 90 in each of the anolyte and catholyte tanks 22 and 24 provides access for an optional electrolyte transfer conduit 92 to provide fluid communication between the anolyte tank 22 and the catholyte tank 24 when the tanks are aligned side-by-side.

In this configuration, flow rate of electrolyte between the tanks 22 and 24 is determined based on the level differences. In the illustrated embodiment of FIGS. 12 and 13, the anolyte tank 22 is sized to have a larger volume than the catholyte tank by having a larger width dimension (see also schematic view in FIG. 14A). As described above, in alternate embodiments, the depth of the catholyte tank 224 or 324 may be reduced as compared to the anolyte tank 222 or 322 by increasing the thickness of the bottom wall of the catholyte tank 224 (see FIG. 14B) or by partially filling the catholyte tank 324 with non-reacting materials to reduce some of the tank volume (see FIG. 14C).

As described in EXAMPLE 1 above in a VRB system, without a transfer of electrolyte between the anolyte and catholyte tanks 22 and 24, catholyte volume increases over time, which affects the capacity of the system over time. The electrolyte transfer conduit 92 located at the overflow level in the illustrated embodiment allows for the flow of catholyte from the catholyte tank 24 as the catholyte volume increases into the anolyte tank 22 (see exemplary schematic in FIG. 14A).

In the illustrated embodiment, the electrolyte transfer conduit 92 penetrates each tank 22 and 24 slightly below the liquid level to accommodate electrolyte transfer conduit 92. To control any leak that may occur at the joints between the conduit 92 and the tanks 22 and 24, the conduit connections 168 with each tank 22 and 24 in the illustrated embodiment of FIGS. 12 and 13 are flanged connections 168 surrounded by a well 172 molded into the tanks 22 and 24 at the stepped section 90. The wells 172 may include leak sensors to detect any leaks that may occur. In addition, the conduit connections 168 may include other leak prevention devices, such as unions, axial O-ring fittings, etc.

Figure 25:
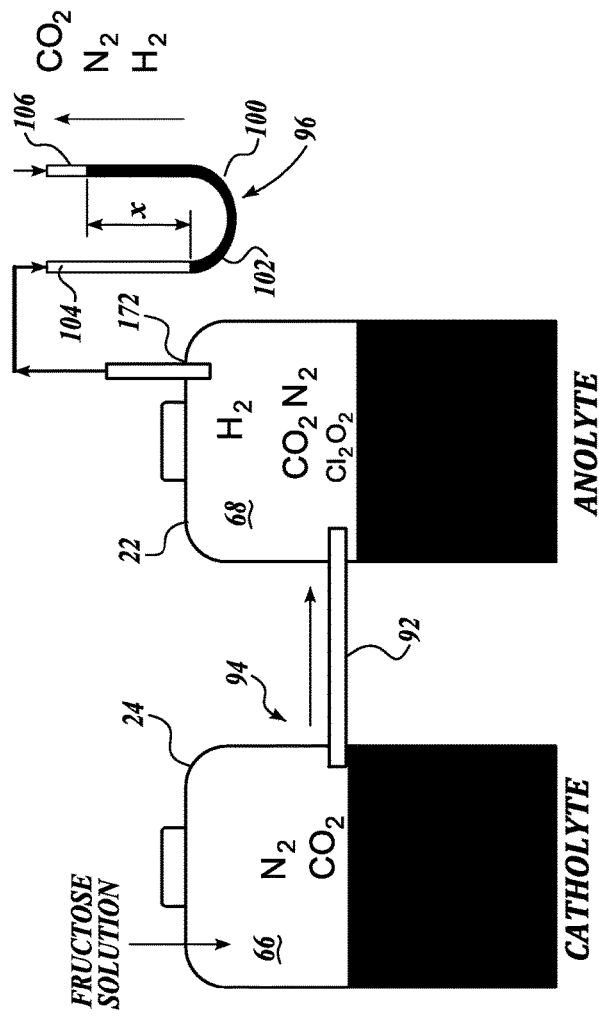
FIGS. 25 and 26A-D are schematic drawings of various components of a gas management system in accordance with embodiments of the present disclosure.

In the illustrated embodiment, the electrolyte level in each of the tanks 22 and 24 may be set so as to allow for the transfer of only liquid electrolyte or of both liquid electrolyte and gas (from the headspaces in the catholyte and anolyte tanks, see e.g., exemplary diagram in FIG. 25) through the electrolyte transfer conduit 92. If a transfer of gas from the headspaces in the catholyte and anolyte tanks is provided, the electrolyte transfer conduit 92 is also a part of the gas management system 94 for the battery, as described in greater detail below.

In one embodiment of the present disclosure, the electrolyte transfer conduit delivers excess catholyte to the anolyte tank 22 during operation to account for the volumetric increase in the catholyte and return the system to a predetermined volume ratio.

In accordance with other embodiments of the present disclosure, the tanks 22 and 24 need not be manufactured to include a stepped section 90 or may include another configuration to accommodate either an electrolyte transfer conduit or another fluid transfer device between tanks 22 and 24. For example, a suitable electrolyte transfer conduit may be located not at an overflow position, but instead below the liquid level in each of the tanks. In such a configuration, the electrolyte transfer conduit would provide continuous electrolyte exchange between the anolyte and catholyte. The rate of exchange may be determined in part by the length and diameter of the transfer conduit.

In addition to passive electrolyte transfer mechanisms, active electrolyte transfer mechanisms are also discussed below.

Example 6

Long-Term Performance of Auto-Balanced System

Figure 20:
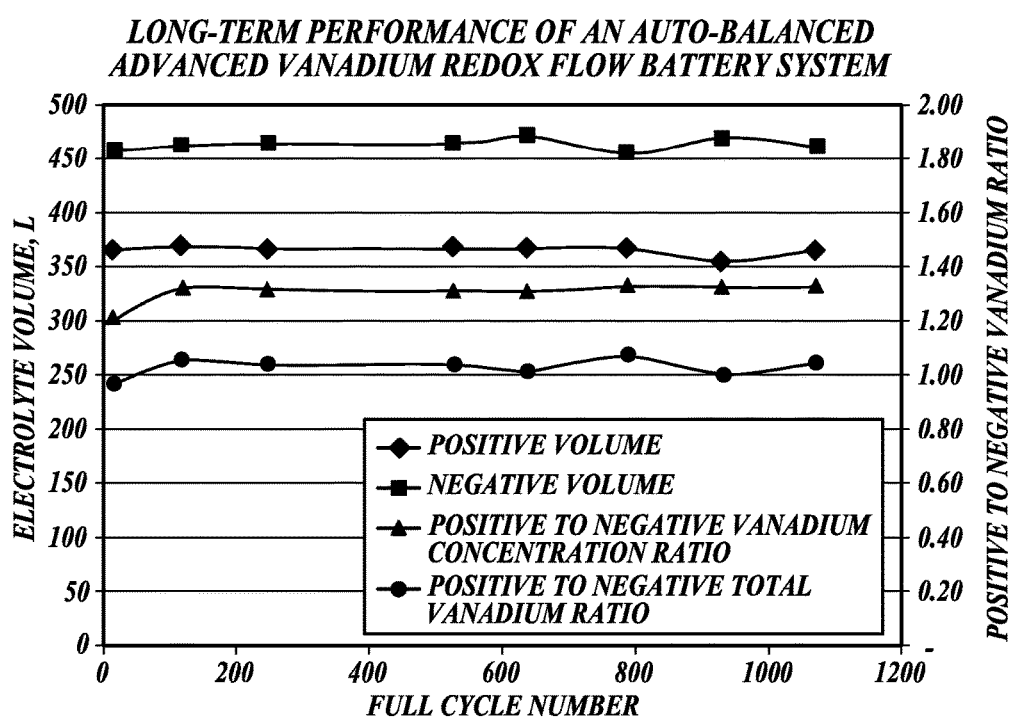
Figure 21:
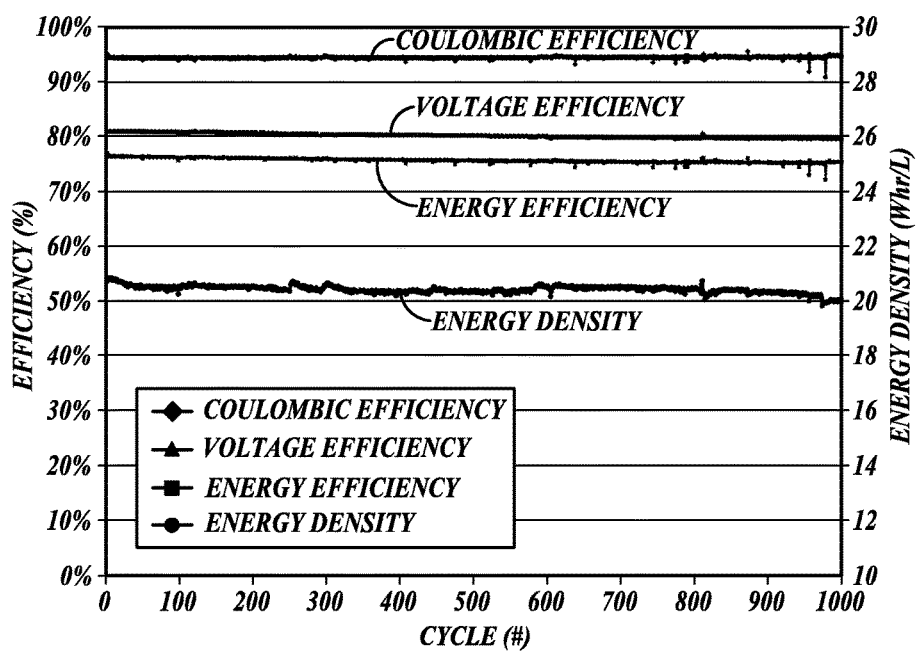

Exemplary test data was sampled during over 1000 continuous charge/discharge cycles, and plotted as a function of the number of cycles on a representative 31.5 kW stack. The test system included a passive overflow electrolyte transfer conduit in accordance with embodiments of the present disclosure. Test data in FIG. 20 shows the electrolyte transfer conduit achieved substantially uniform catholyte and anolyte volumes, catholyte to anolyte vanadium concentration ratio, and catholyte to anolyte total vanadium ratio for more than 1000 full charge/discharge cycles. Test data in FIG. 21 shows substantially uniform Coulombic efficiency, voltage efficiency, energy efficiency, and energy density for more than 1000 full charge/discharge cycles.

Active Transfer of Electrolyte

In addition to, or in lieu of the passive transfer system, the RFB module 20 may include an active transfer system configured for actively transferring electrolyte from one to the other of the catholyte and anolyte tanks. Such active transfer may include pumping or otherwise controlling electrolyte tank-to-tank transfer using a valve system. The active transfer may be automatically controlled based on system conditions or manually controlled by an operator.

If a combination of passive and active electrolyte transfer systems is employed, the active system may use the same or a separate electrolyte transfer conduit as the passive system.

Electrolyte Capacity Adjustment Using Additives

In addition to electrolyte transfer between the anolyte and catholyte tanks, electrolyte capacity can also be adjusted by adding reductive reagents to the positive electrolytes. Suitable reagents may include hydrocarbons, such as fructose. These reductive reagents can be oxidized by the catholyte, releasing carbon dioxide. Such reductive reagents may be added periodically, for example, during scheduled maintenance or automatically by the BMS system during battery operation.

Fructose added to the catholyte is reduced according to the following formula, consuming hydrogen and generating carbon dioxide and water:

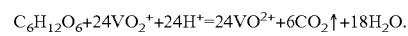

$$C_6H_{12}O_6+24VO_2^++24H^+=24VO^{2+}+6CO_2\uparrow+18H_2O.$$

String Capacity Management of Electrolyte

As described above, passive capacity management has been shown to maintain stable performance under most conditions for a single battery. However, other operating conditions may occur that require active capacity management, especially on the string and site level.

In one example, stack variation caused by differences in manufacturing assembly and materials may produce slightly different performance characteristics between each of the four RFBs 20 in a string 10 (see exemplary string diagrams in FIGS. 2 and 6), in some cases leading to different membrane ion transfer capabilities or different levels of side reactions, both of which contribute to performance mismatch in a string of batteries. One mechanism that may be affected by manufacturing differences in stacks can be seen during battery operation in the way ions travel back and forth through the membrane separating positive and negative electrolytes as they form a closed electrical circuit, and in the way water molecules travel through the membrane together with other hydrated ions or by themselves. As a result of stack differences, the volume of the positive and negative electrolytes and the concentrations of active ions in the electrolytes may change at different rates during battery operation.

In another example, stack variations caused by damage (leakage, blockage, etc.) to one or more stack cells may produce slightly different performance characteristics when the stacks are assembled as batteries and strings, and may also cause an imbalance in the predetermined battery tank volume ratio described above. Other reasons for stack variation may include differences in the electrode, stack compression, etc.

Because there may be performance differences between batteries in a string and all batteries in a string are electrically connected for charge and discharge operations, the worst performing battery determines the performance of the string. Further, because each battery in the string has dedicated electrolyte tanks, lower performing batteries may continue to experience declining performance caused, for example by the by stack variation described above. Declining battery capacity is generally indicative of or may lead to electrolyte stability and capacity problems for the associated string. If left unchecked, these performance variations may result in decreased capacity across a site.

Exemplary test data showing string declining performance is illustrated below in EXAMPLES 7 and 8.

Example 7

Energy Density

Figure 22:
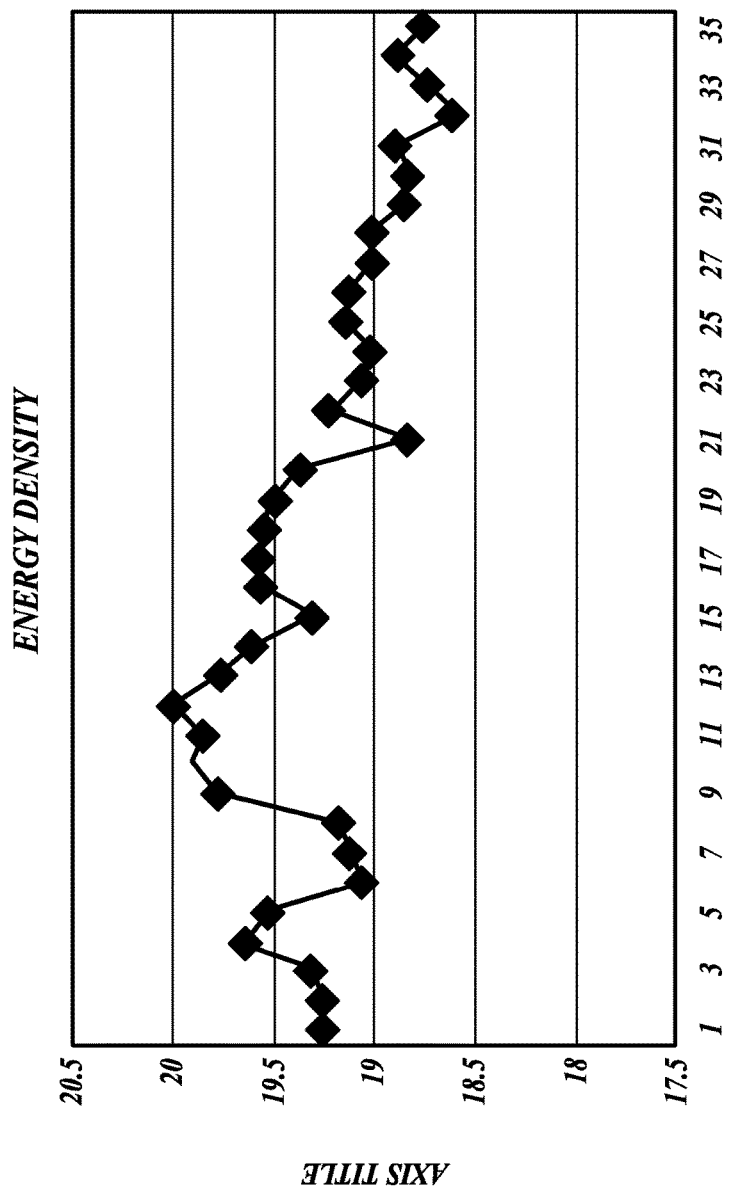
FIGS. 22-24 are graphical depictions of data regarding capacity management in an exemplary vanadium RFB string.

In a string of three, series-connected, kW-scale batteries without capacity management adjustments, a steady decline in energy density over 35 cycles can be seen in FIG. 22.

Example 8

Open Circuit Voltage

Figure 23:
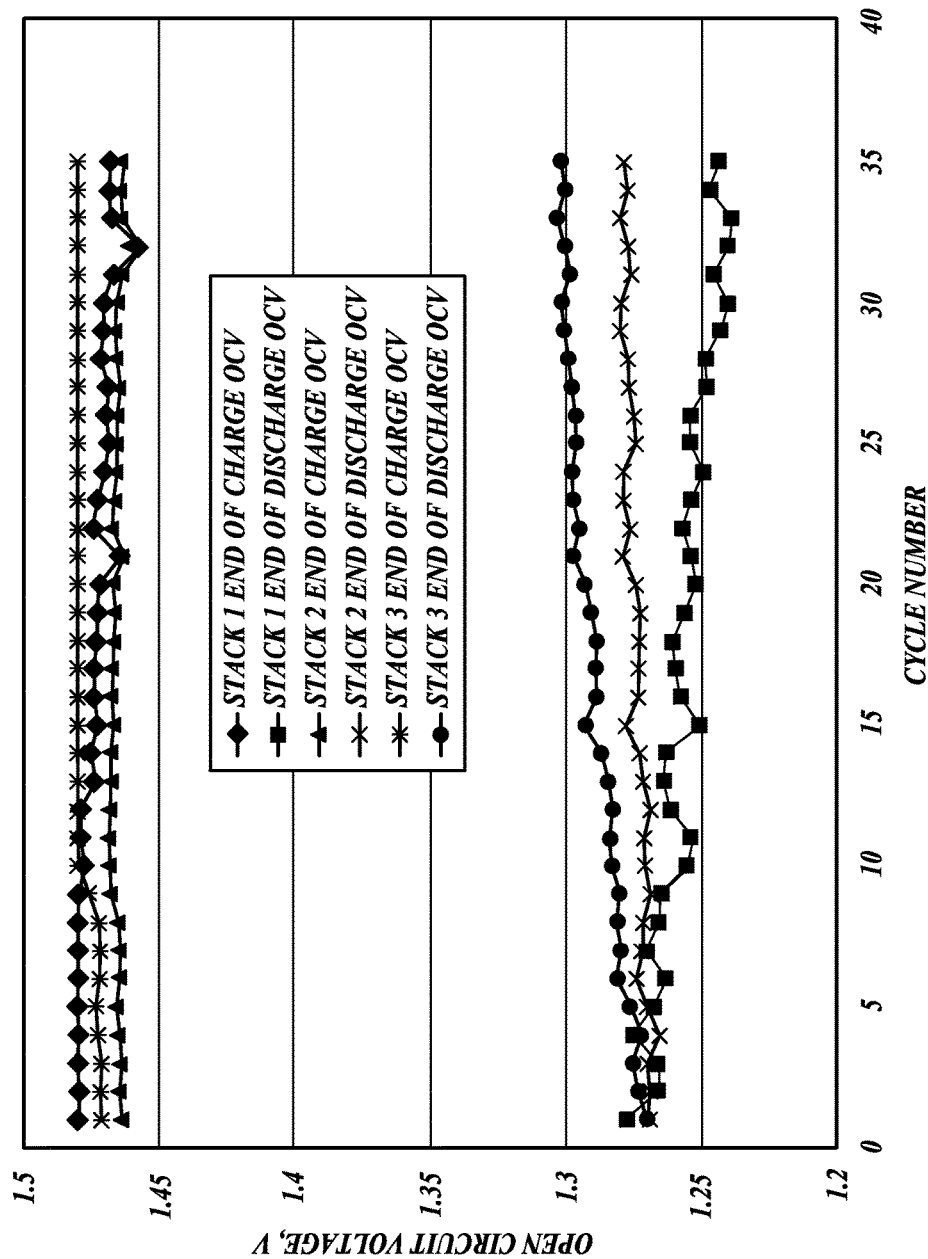

In a string of three, series-connected, kW-scale batteries without capacity management adjustments, a steady deviation in open circuit voltage (OCV) at the end of discharge over 35 cycles can be seen in FIG. 23.
Active Electrolyte Adjustments Based on Open Circuit Voltage To manage battery capacity on the string or site level, open circuit voltage (OCV) values can be measured on the cell, stack, and battery level for each RFB in a string. OCV is the difference in electrical potential between two terminals of a device when it is disconnected from the circuit. After measuring, a selected OCV value can be chosen as a baseline for the other batteries in the system. As a non-limiting example, the selected OCV value may be the lowest OCV value in the string. Therefore, in accordance with one embodiment of the present disclosure, the other RFBs in the string can then be adjusted to correspond to the selected OCV value. As another non-limiting example, the selected OCV value may have a predetermined OCV value compared to others in the string.

In accordance with some embodiments of the present disclosure, adjusting the OCV value for each battery includes transferring a volume of catholyte to the anolyte storage tank or a volume of anolyte to the catholyte storage tank. In another embodiment of the present disclosure, adjusting the OCV value for each battery includes transferring a volume of catholyte from another source outside the battery, such as from another battery, to the anolyte storage tank or a volume of anolyte from another source outside the battery, such as from another battery, to the catholyte storage tank.

In one embodiment of the present disclosure, active capacity management utilizes positive electrolyte pump pressure, managed by control valves, to transfer electrolyte from the anolyte pump discharge line to the catholyte return line or from the catholyte pump discharge line to the anolyte return line. Such pump may be the same or different from a pump used for actively transferring electrolyte from one to the other of the catholyte and anolyte tanks, as described above. Active measures for capacity management may be controlled by the BMS as dictated by operating conditions. In other embodiments, active transfer can be accomplished manually or semi automatically using external pumps or other common fluid transfer devices.

Another form of active capacity management is to automatically or manually inject reactants into the electrolyte to cause a chemical rebalancing. In one example, a measured amount of fructose is added to the catholyte, which is reduced according to the following formula:

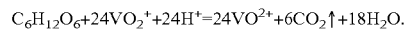

$$C_6H_{12}O_6 + 24VO_2^+ + 24H^+ = 24VO^{2+} + 6CO_2\uparrow + 18H_2O.$$

In other embodiments of the present disclosure, other reducing agents may be added to the catholyte, including but not limited to sugars, alcohols, organic acids, oils, hydrocarbons, and any combination thereof. In yet other embodiments of the present disclosure, other oxidizing agents may be added to the anolyte, including but not limited to air, oxygen, hydrogen peroxide, ozone, and any combinations thereof.

Adjusting OCV may be controlled by the battery management system (BMS) during battery operation or may be performed during maintenance of the redox flow battery.

Example 9

Stack Performance Recovery

Figure 24:
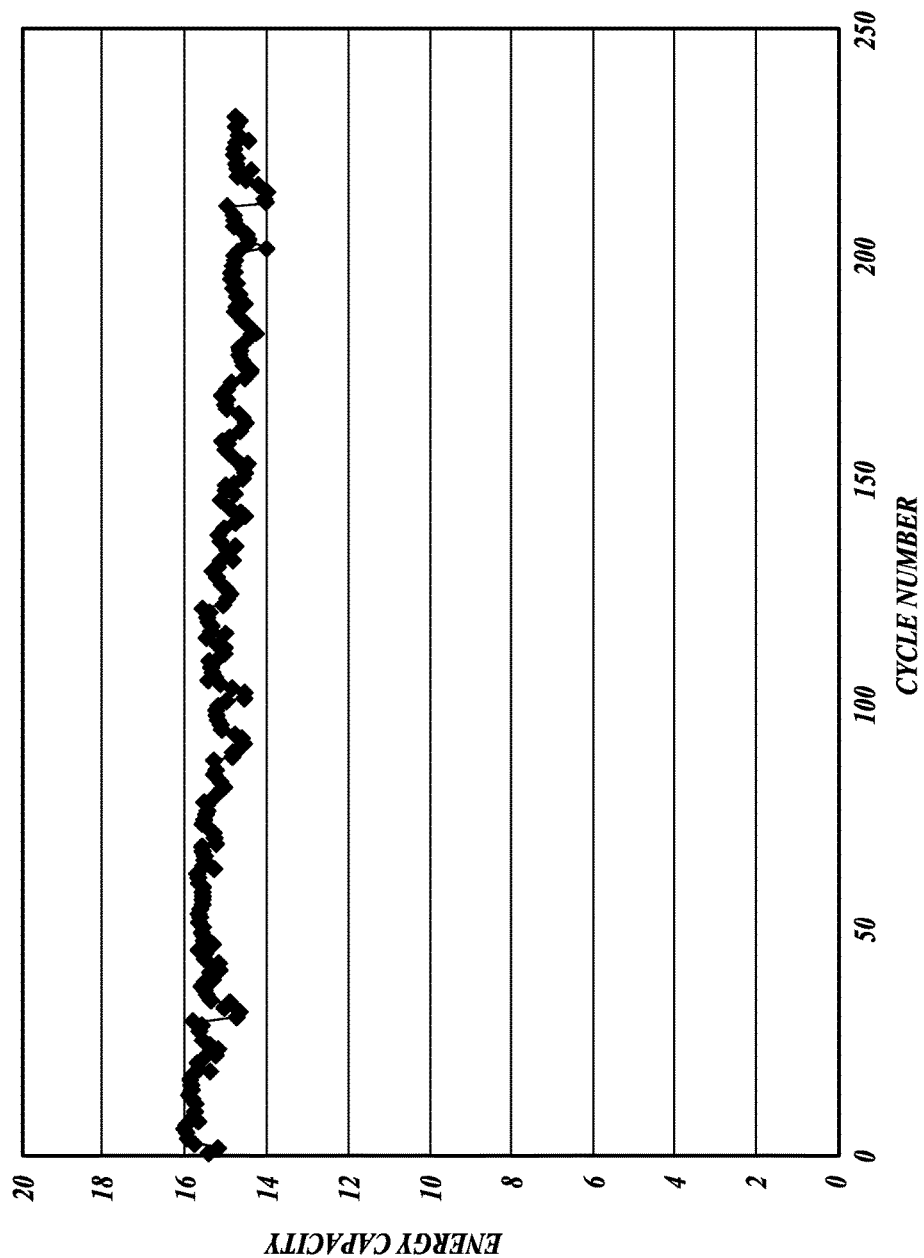

In a string of three, series-connected, kW-scale batteries with capacity management adjustments, the energy density decline of about 7% is shown in FIG. 24 for over 200 cycles. As compared to the energy density decline in FIG. 22 of about 7% over only 35 cycles, matching operation mitigates performance degradation of a battery string.
Gas Generation During Operation As discussed above, most RFBs have side reactions, such as hydrogen generation. Hydrogen generation increases the average oxidation state of the electrolytes, which can result in a capacity decrease. In addition, hydrogen gas generation in a closed space can create safety concerns. Further, most RFB negative electrolyte solutions include strong reductants that can be oxidized by oxygen in the air. Such oxidation also increases the average oxidation state of the electrolytes, which can result in a capacity decrease, as discussed below in EXAMPLE 10.

For chloride-containing redox flow battery systems, a small amount of chlorine gas may be generated. Chlorine gas is a strong oxidant, and therefore, can be rapidly absorbed by the negative electrolyte solutions through surface contact if the chlorine gas is permitted to travel to the headspace of the anolyte, as discussed below with reference to a gas management system.

Example 10

Anolyte Instability when Exposed to Air

Figure 27:
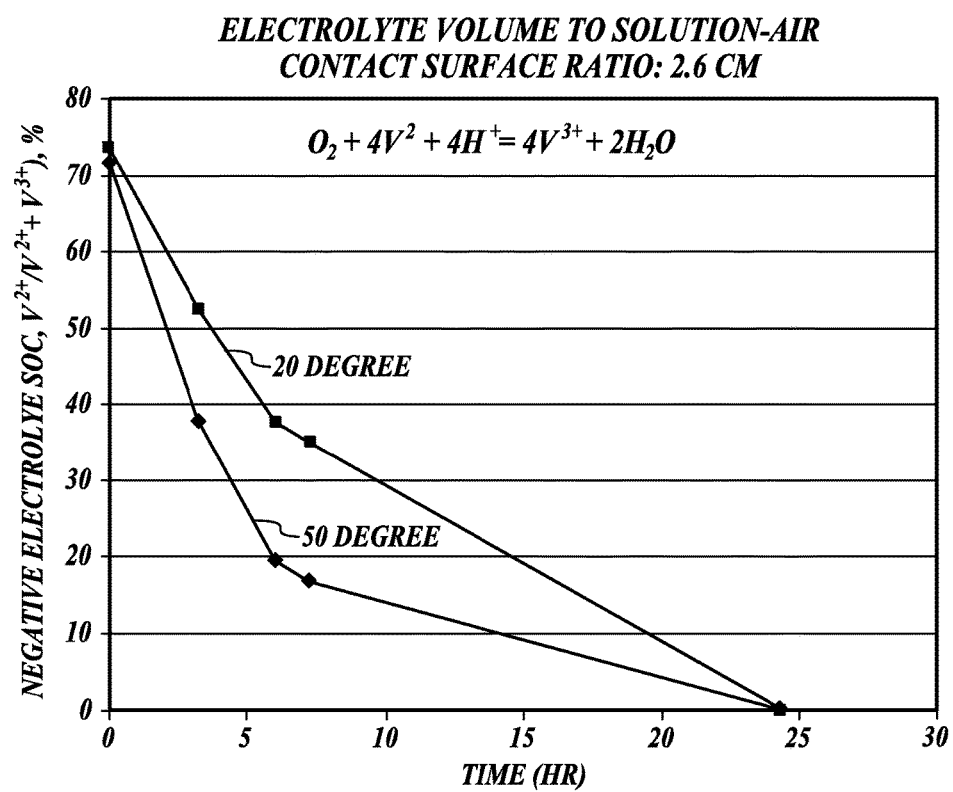
FIGS. 27-30 are graphical depictions of data regarding gas management in an exemplary vanadium RFB module.
Figure 28:
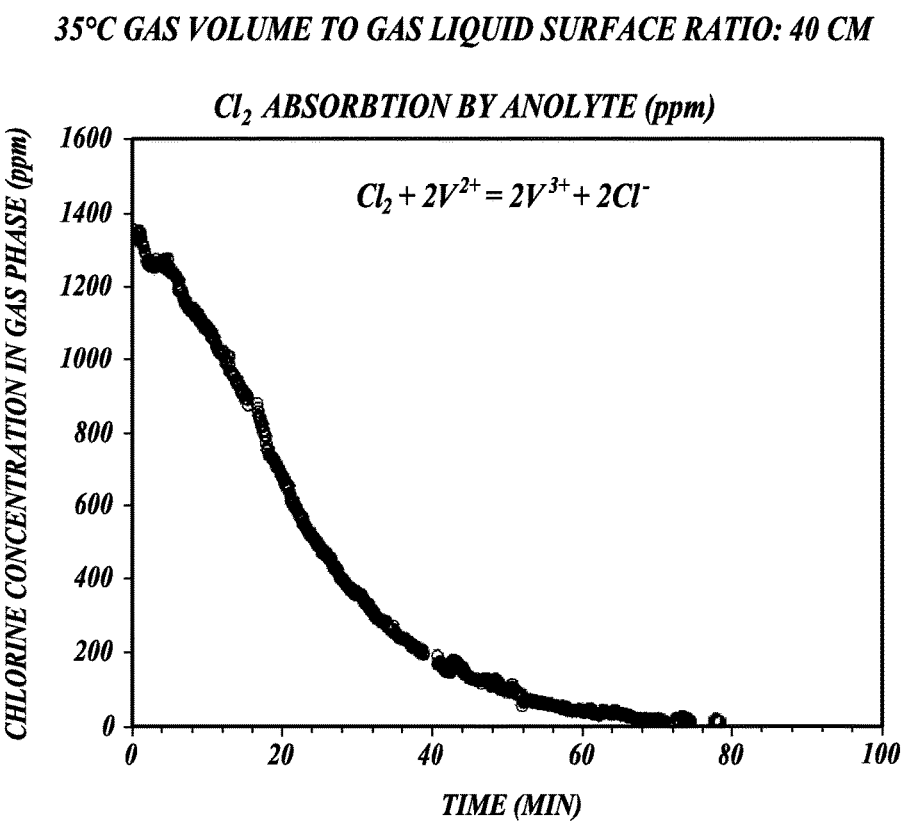

The anolyte in a VRB was exposed to air with a solution-air contact surface ratio of 2.6 cm. As seen in FIG. 27, the anolyte state of charge decreased rapidly from over 70% to 0% in less than 25 hours.
Gas Management System A gas management system can be employed to manage the gasses generated in a RFB. Although the gas management system described herein is designed for a vanadium redox flow battery, the same gas management system concepts may be applied to other non-vanadium redox flow batteries.

With reference to the simplified schematic in FIG. 25, the components of the gas management system 94 will now be described. As discussed above, catholyte and anolyte tanks 22 and 24 are in a substantially sealed system with liquid electrolyte in each tank, and each tank may include a headspace above the respective anolyte and catholyte. In the illustrated embodiment, the headspaces above the anolyte and catholyte have free gas exchange with the respective anolyte and catholyte. In the illustrated embodiment, the gas management system 94 includes the gas headspaces 66 and 68, a gas transfer device between the catholyte and anolyte tanks 22 and 24, such as electrolyte transfer conduit 92 (which also allows for gas transfer), and a gas pressure management system 96 (shown as U-tube 100, to be described in greater detail below). In one embodiment, as discussed above, the gas transfer device may be a conduit that allows for gas in the respective anolyte and catholyte headspaces to diffuse and exchange with each other. The rate of exchange is determined by the cross-section area, length of the conduit, and gas diffusion rate.

Figure 29:
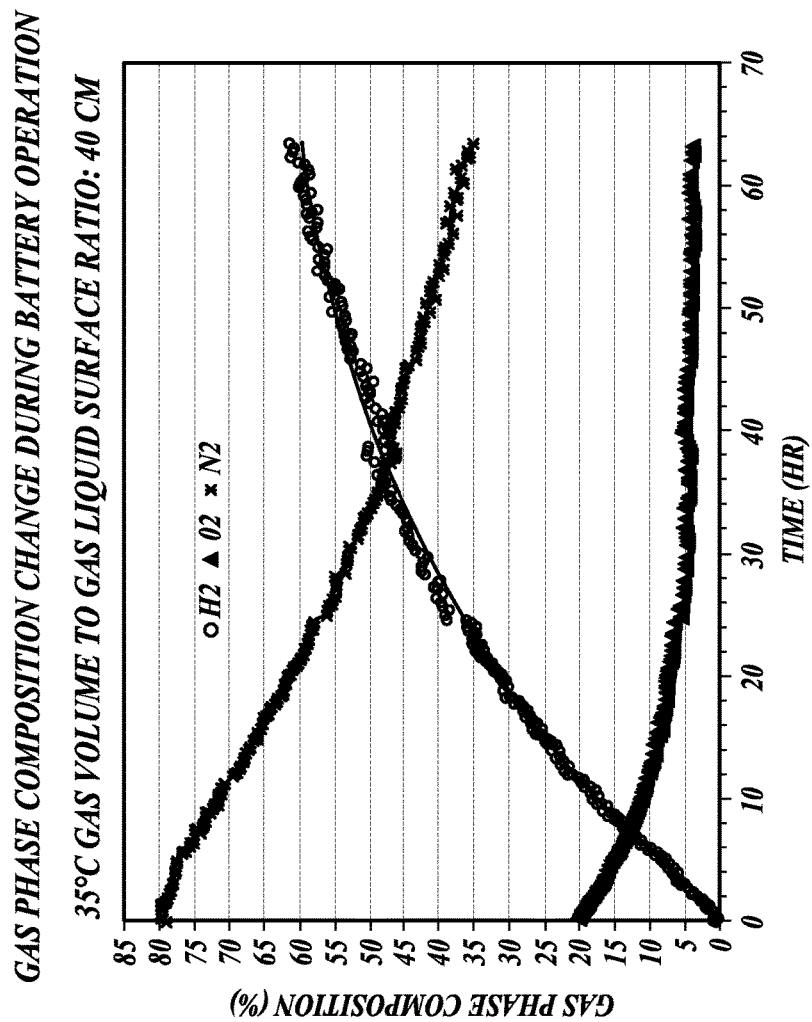

During operation, anolyte and catholyte tanks 22 and 24 are filled with electrolyte up to a fill line allowing for a headspace in each tank 22 and 24, and then sealed. The RFB system 20 is started in operation and the gas compositions of the headspaces start to change as oxidation starts to occur and hydrogen starts to be generated, as seen in FIG. 29. In one mode of operation, air is present in the respective headspaces of the anolyte and catholyte headspaces during electrolyte filling or other maintenance operations when the tanks are sealed. In another embodiment, the headspaces are purged with nitrogen or another inert gas as part of the sealing process.

As discussed above, the tank system may include a tank electrolyte transfer conduit 92 located at or below an overflow level in either the anolyte or catholyte tank 22 or 24. The electrolyte transfer conduit 92 may allow for the transfer of liquid electrolyte and gas exchange from the headspaces in the anolyte and catholyte tanks 22 and 24. If the transfer of gas from the headspaces in the anolyte and catholyte tanks 22 and 24 is provided in the electrolyte transfer conduit 92, then the electrolyte transfer conduit 92 is also a part of the gas management system for the RFB 20.

In another embodiment, the gas transfer device may be an independent gas transfer device different from the electrolyte transfer conduit 92. For example, the gas transfer device may be a conduit designed for gas exchange between the anolyte and catholyte headspaces 66 and 68, but not for liquid electrolyte transfer. In another embodiment, the gas transfer device may include one or more conduits which may be independent gas transfer devices or may be combined with an electrolyte transfer conduit. The gas transfer device (shown as electrolyte transfer conduit 92 in the illustrated embodiment of FIG. 25) provides a means to equalize the pressure between the anolyte and catholyte tanks, control the flow and exit location of gasses vented by the gas management system, and allows for diffusion of gas between the anolyte and catholyte tanks.

In one embodiment of the present disclosure, for example, a VRB, chlorine gas generated in the catholyte tank 24 by the following equation diffuses through the gas transfer device 92 and moves to the headspace in the anolyte tank 22.

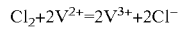

When in the anolyte headspace over the anolyte surface, the chlorine gas is absorbed by the anolyte as it oxidizes to $Cl_2O_2$. The chlorine gas oxidizes quickly, before it has a chance to vent from the gas management system 94 through the gas pressure management system 96, described below.

Example 11

Chlorine Gas Absorption by Anolyte

Figure 26:
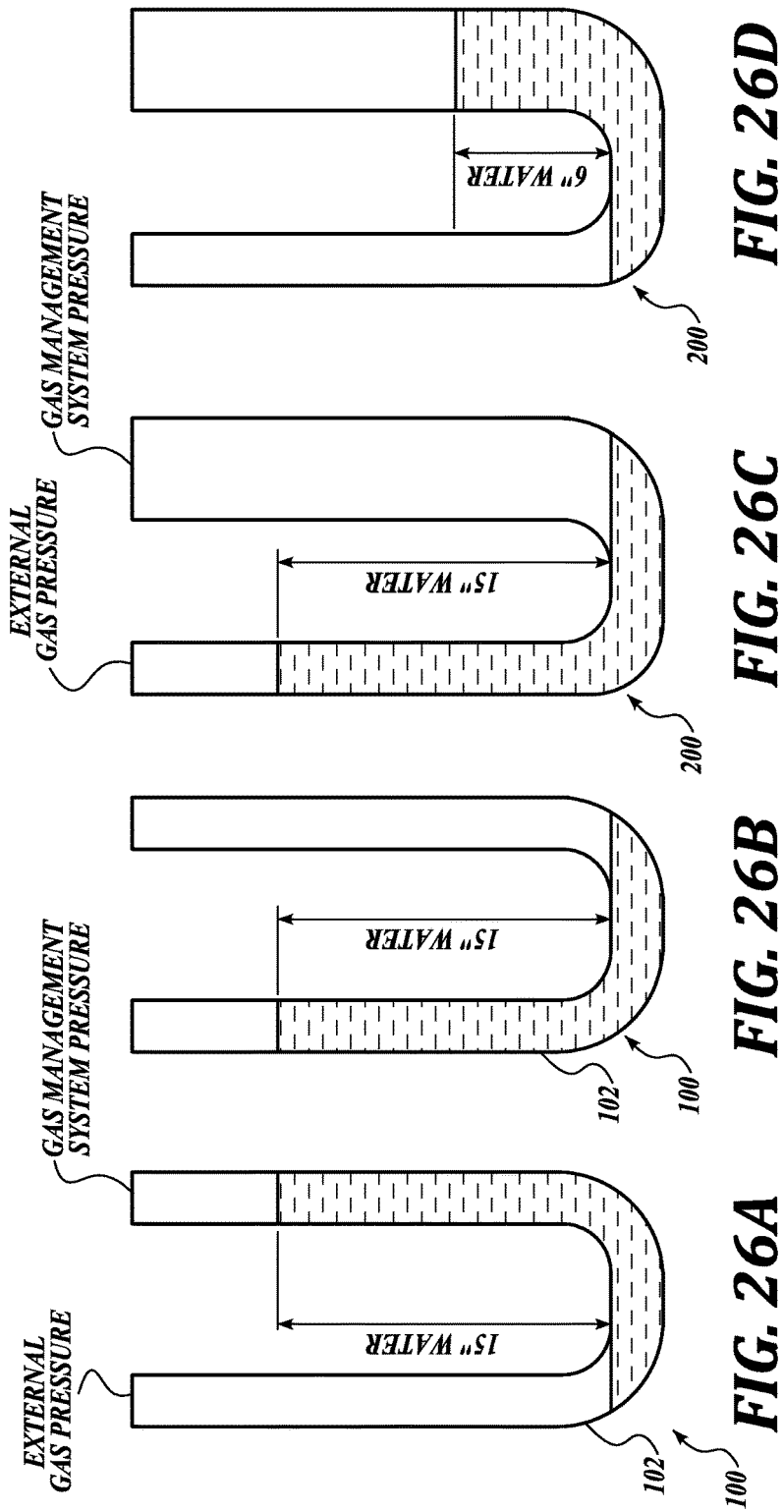

As seen in FIG. 26, in an anolyte at 35 degrees Celsius having a gas volume to gas-liquid surface ratio of 40 cm, chlorine concentration in the gas phase at 1400 ppm is absorbed to 0 ppm in less than 80 minutes.

Gas Pressure Control

In addition to the gas transfer device, the gas management system 94 may also include one or more gas pressure management systems 96 to maintain a barrier between ambient air and the gas management system 94, control gas pressure in the headspaces 66 and 68 of the gas management system 94, and allow any necessary bi-directional pressure equalization between ambient air and the gas management system 94. In that regard, the gas pressure management device 96 may allow for the release of excess hydrogen gas generated by the anolyte in the anolyte tank 22. The gas pressure management device 96 may also release carbon dioxide and nitrogen, and any other gases that may build up in the gas management system 94. However, as discussed above, any chlorine gas generated by a system (such as a vanadium redox flow battery containing chloride) tends to be absorbed by the anolyte if the chlorine gas is allowed to migrate from the headspace in the catholyte tank 24 to the headspace in the anolyte tank 22 through gas transfer device 92.

Figure 13:
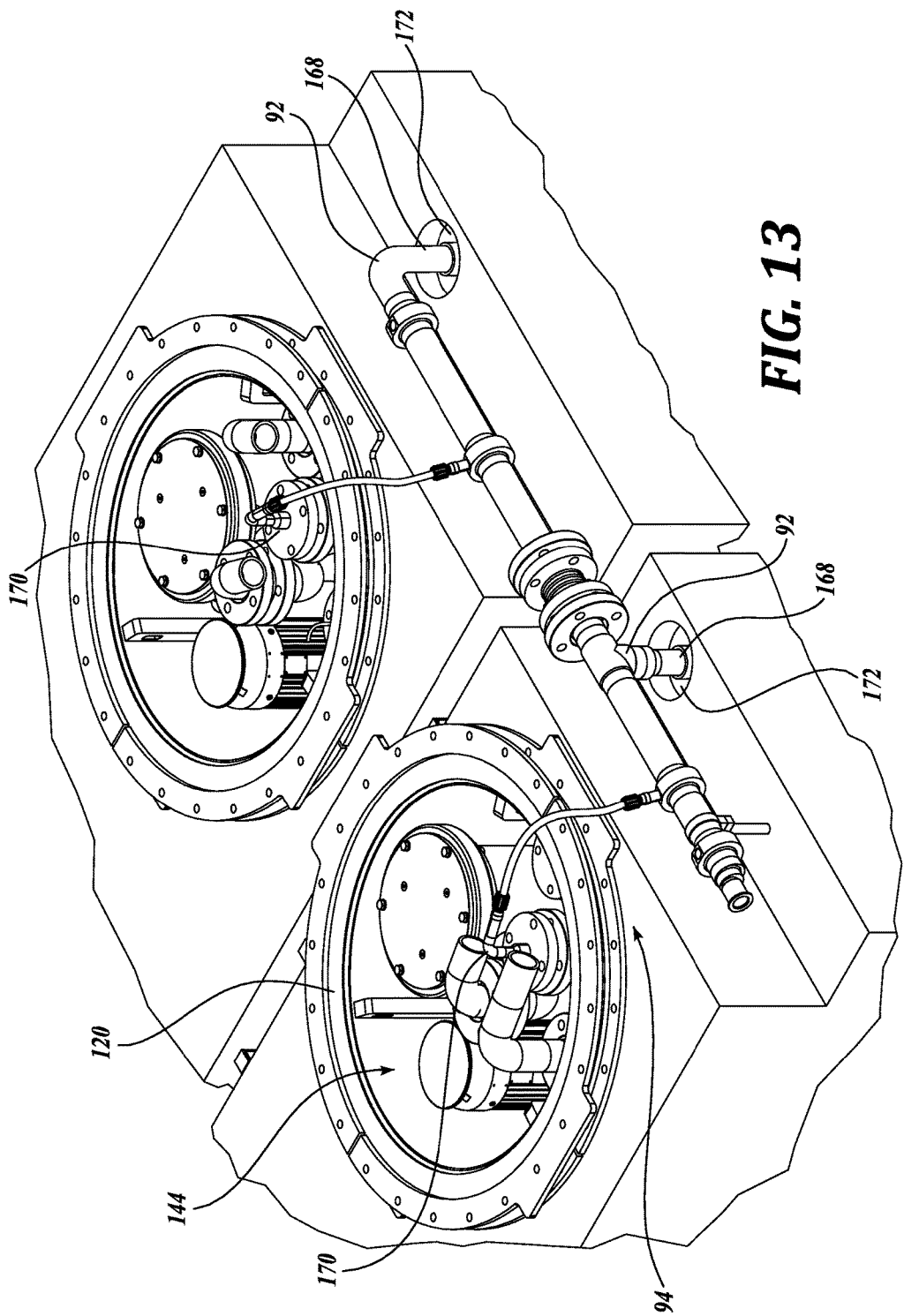
Figure 14A:
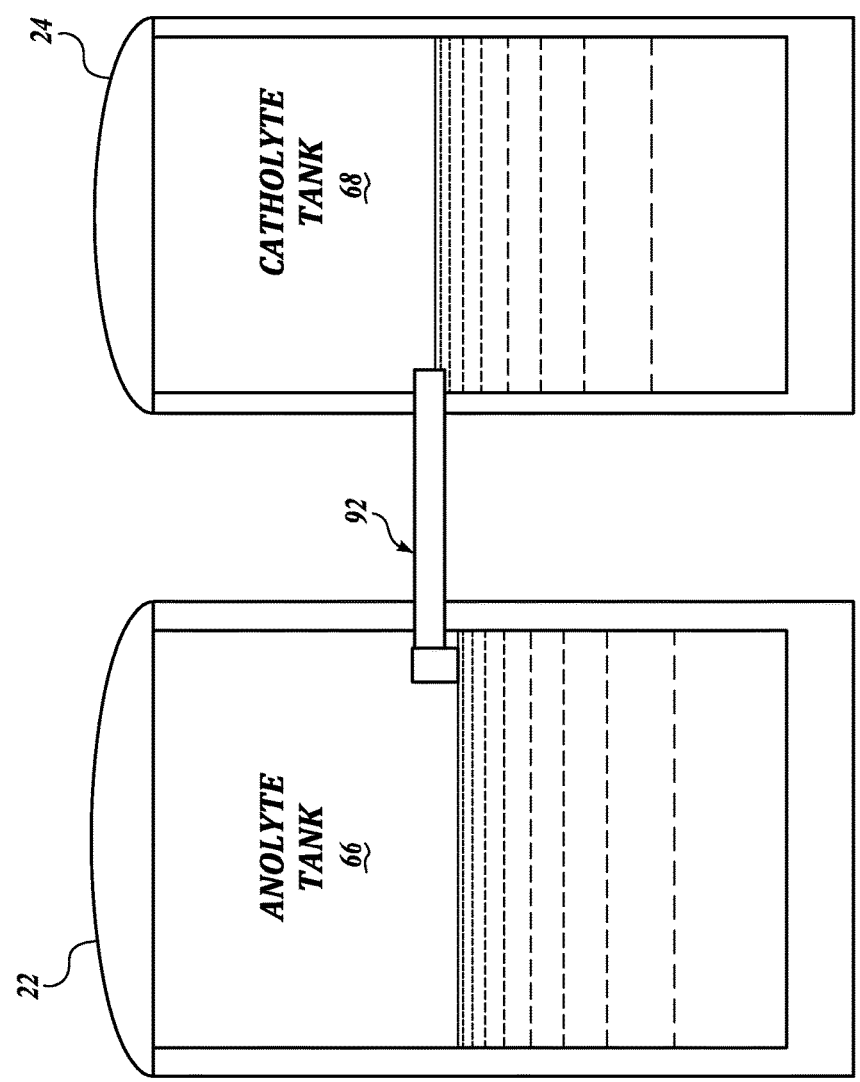
FIGS. 14A, 14B, and 14C are schematic views of RFB modules having non-uniform anolyte and catholyte tank volumes in accordance with embodiments of the present disclosure.
Figure 14B:
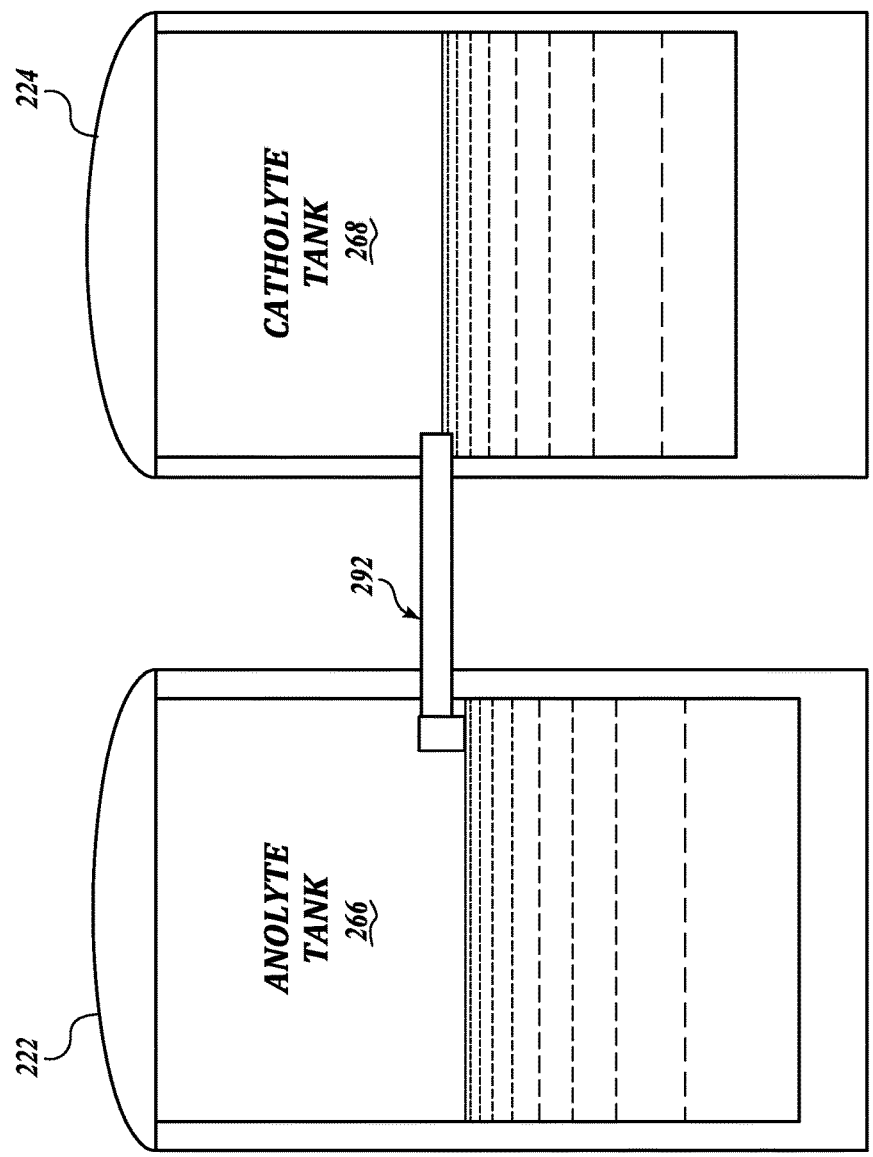
Figure 14C:
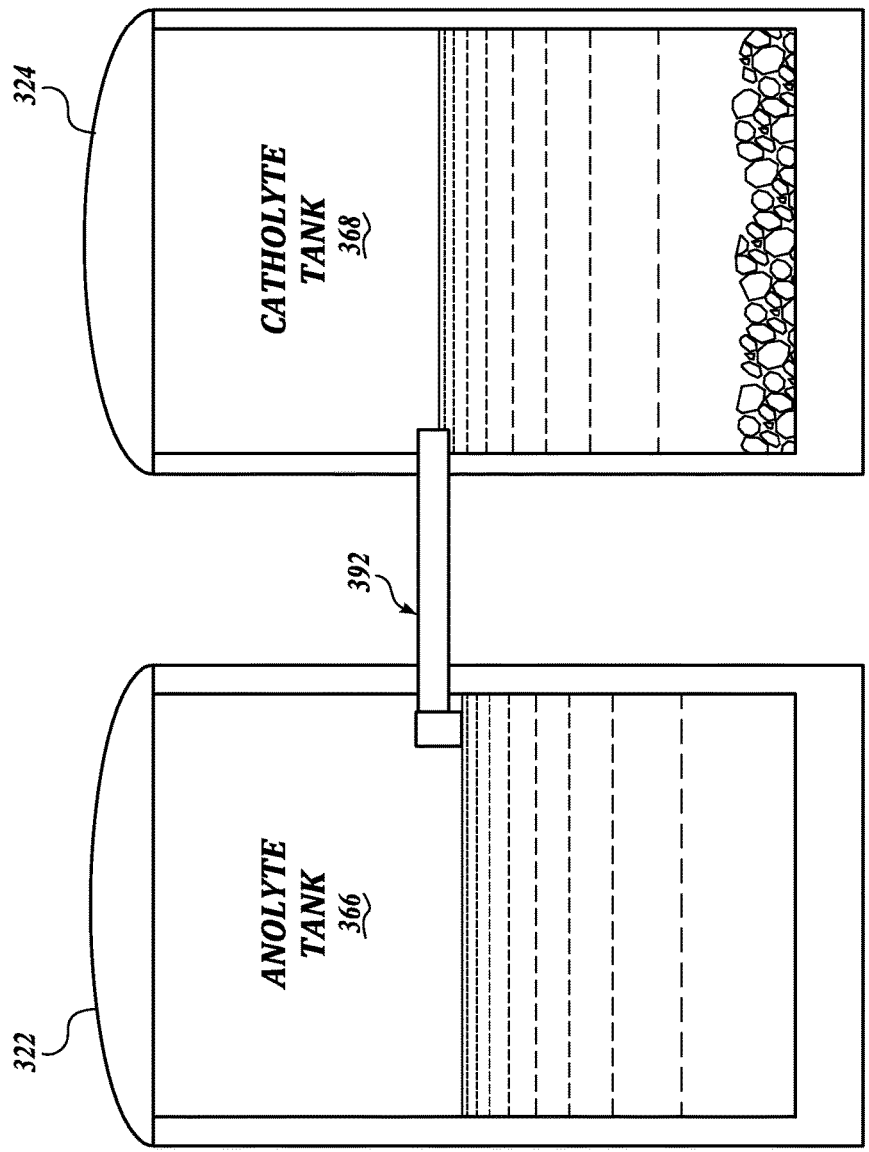

Referring to the illustrated embodiment of FIG. 13, the piping interface 144 of the pump tub assembly 120 may also include a third connector 170 that connects the head space 66 of the anolyte tank 22 and the head space 68 of the catholyte tank 24 through the gas transfer device 92 (see also FIG. 14A).

Referring to FIG. 25, in accordance with one embodiment of the present disclosure, the gas pressure control device is a U-shaped tube (U-tube) 100 in fluid communication with the headspace 66 of the anolyte tank 22. Although shown in fluid communication with the headspace 66 of the anolyte tank 22, the U-tube 100 could also be suitable configured to be in fluid communication with the headspace 68 of the catholyte tank 24.

As illustrated in FIGS. 2 and 25, a connector point 172 provides an access position for the gas pressure management system 96 to the head space 68 in the anolyte tank 22. However, other suitable connector points are within the scope of the present disclosure. In the illustrated embodiment, the U-tube 100 has a U-shaped body 102 and a first open end 104 in fluid communication with the headspace of the gas management system 94 and a second open end 106 in fluid communication with an external atmosphere. The body 102 contains an amount of liquid 108 that remains in the plumbing trap created by the U-shaped body 102 between the first and second ends.

In the illustrated embodiment, the U-tube body 102 is a conduit which may have a constant cross-sectional area along the length of the U-tube from the first end 104 to the second end 106. In another embodiment, the U-tube body 102 may have a different cross-sectional area at the first end, as compared to the second end (see FIG. 26).

The U-tube body may be designed to include baffles or enlarged sections to prevent the loss of liquid as a result of bubbling or a sudden discharge of gas.

As non-limiting examples, the U-tube may be filled with a liquid selected from the group consisting of water, an alkaline aqueous solution, propylene glycol, ethylene glycol, an aqueous solution of inorganic compound, an aqueous solution of organic compound, a water insoluble organic liquid, and combinations thereof, through which certain gases in the headspaces of the RFB will diffuse. A suitable liquid may be selected depending on the system, operating pressures, and types of gasses being emitted from the gas management system 94. Other suitable liquids may be selected to provide certain operating characteristics, for example, a desired temperature range or an ability to scrub or eliminate undesired vent gases (such as chlorine) from atmospheric discharge. In some non-limiting examples, the U-tube 100 may include a combination of liquids, for example, an alkaline solution with an oil layer on top.

The U-tube 100 of the present disclosure allows for bi-directional gas exchange between the gas management system and the atmosphere. In the illustrated embodiment, the U-tube 100 is in fluid communication with the anolyte headspace in the anolyte tank 22 and the atmosphere. In one non-limiting example shown in FIGS. 26A and 26B, the U-tube 100 may include, for example, 15 inches of water. When the pressure inside the anolyte headspace exceeds 15 inches of water, gases such as hydrogen may start to bubble out of the tube into the atmosphere.

The U-tube may be configured to allow entry of an external gas into the gas management system when an exterior battery pressure exceeds an interior battery pressure, for example, greater than or equal to 15 inches water. In the same example, the U-tube will prevent the entry of an external gas into the anolyte storage tank when the exterior battery pressure exceeds the interior battery pressure by less than 15 inches water. In addition, the tank head space may have some flexibility to allow for expansion.

As seen in FIGS. 26A and 26B, the U-tube 100 may have a uniform cross-section at the first and second ends. In another embodiment of the present disclosure shown in FIGS. 26C and 26D, a U-tube 200 may have a different cross-sectional area at the first end, as compared to the second end. The effect of a change in cross-sectional area is that the pressure set points for gas entering and leaving the gas management system may be different. For example, the first and second end cross-sectional areas may be sized so that the pressure requirement for gas exiting the gas management system is 15 inches of water, but the pressure requirement for gas entering the gas management system from the atmosphere is only 6 inches of water.

In one embodiment of the present disclosure, the interior battery pressure in the anolyte headspace is between −10 kPa and 10 kPa, −5 kPa to +5 kPa, and −3 kPa to +3 kPa.

As a non-limiting example, a U-tube 100 may have a length of 24 inches and a uniform diameter at the first and second ends of 2 inches. As another non-limiting example, a U-tube may have a length of 24 inches and a non-uniform diameter at the first and second ends of 1.5 and 2 inches. As described above, such variations may independently change the pressure regulation and the resulting rate of transfer of gases into or out of the gas management system.

In accordance with other embodiments of the present disclosure, the gas pressure management device may include more than one U-tube device, one or more pressure regulating valves, one or more check vales, or a combination of these or other pressure management devices.

As discussed above, hydrogen generation can be a concern in RFBs. In that regard, hydrogen in combination with other gases may reach a flammability limit and pose a risk of ignition. The closed gas management system mitigates this risk by keeping constituent gases in tank head spaces below flammability limits as described below in EXAMPLES 12 and 13.

Example 12

Gas Phase Composition Change During Battery Operation

As seen in FIG. 29, hydrogen, oxygen, and nitrogen gas phase composition changes during battery operation. In that regard, hydrogen is generated by side reactions, from 0% to about 60% after 60 hours of operation. Oxygen decreased from about 20% to less than 5% after 60 hours of operation. The oxygen was consumed by a vanadium oxidation reaction. Nitrogen decreased from about 80% to about 35%.

Example 13

Limits of Flammability of Hydrogen

Figure 30:
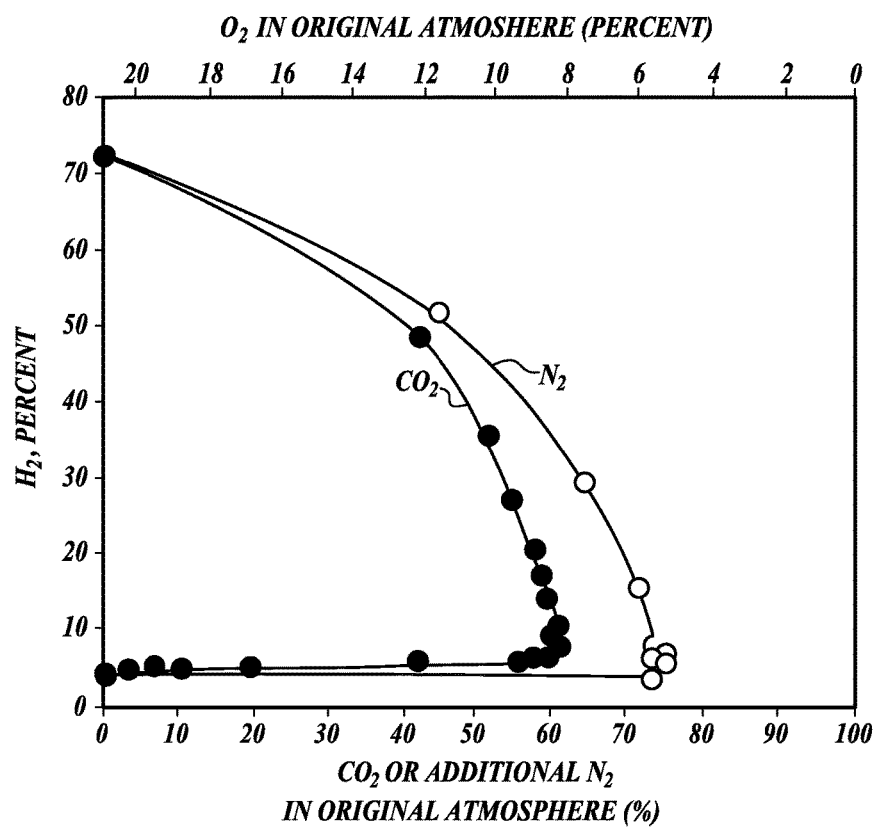

As seen in FIG. 30, H. F. Coward and G. W. Jones, Limits of Flammability of Gases and Vapors, Bureau of Mines Bulletin 503 (1952), when the oxygen level in air and carbon dioxide or nitrogen is less than 5%, the gas mixture is not flammable. Because the gas management system is a closed system, no additional oxygen becomes available.

Active Recovery of Average Oxidation State

As discussed above, in addition to electrolyte transfer between the anolyte and catholyte tanks, high electrolyte average oxidation state can be recovered by adding reductive reagents to the positive electrolytes. Suitable reagents may include hydrocarbons, such as fructose. These reductive reagents can be oxidized by the catholyte, releasing carbon dioxide. Such reductive reagents may be added periodically, for example, during scheduled maintenance or automatically by the BMS system during battery operation.

Carbon dioxide generated during this process purges chlorine gas out of the catholyte tank through the gas transfer device to the anolyte tank. As described above, the chlorine gas can then be absorbed in the anolyte. In addition, the generation of carbon dioxide can also purge hydrogen out of the battery system through the gas pressure management device. With reference to EXAMPLE 13 above, the addition of carbon dioxide to the gas management system helps maintain the non-flammable characteristics of the gas management system.

Example 14

Fructose Addition

Figure 31:
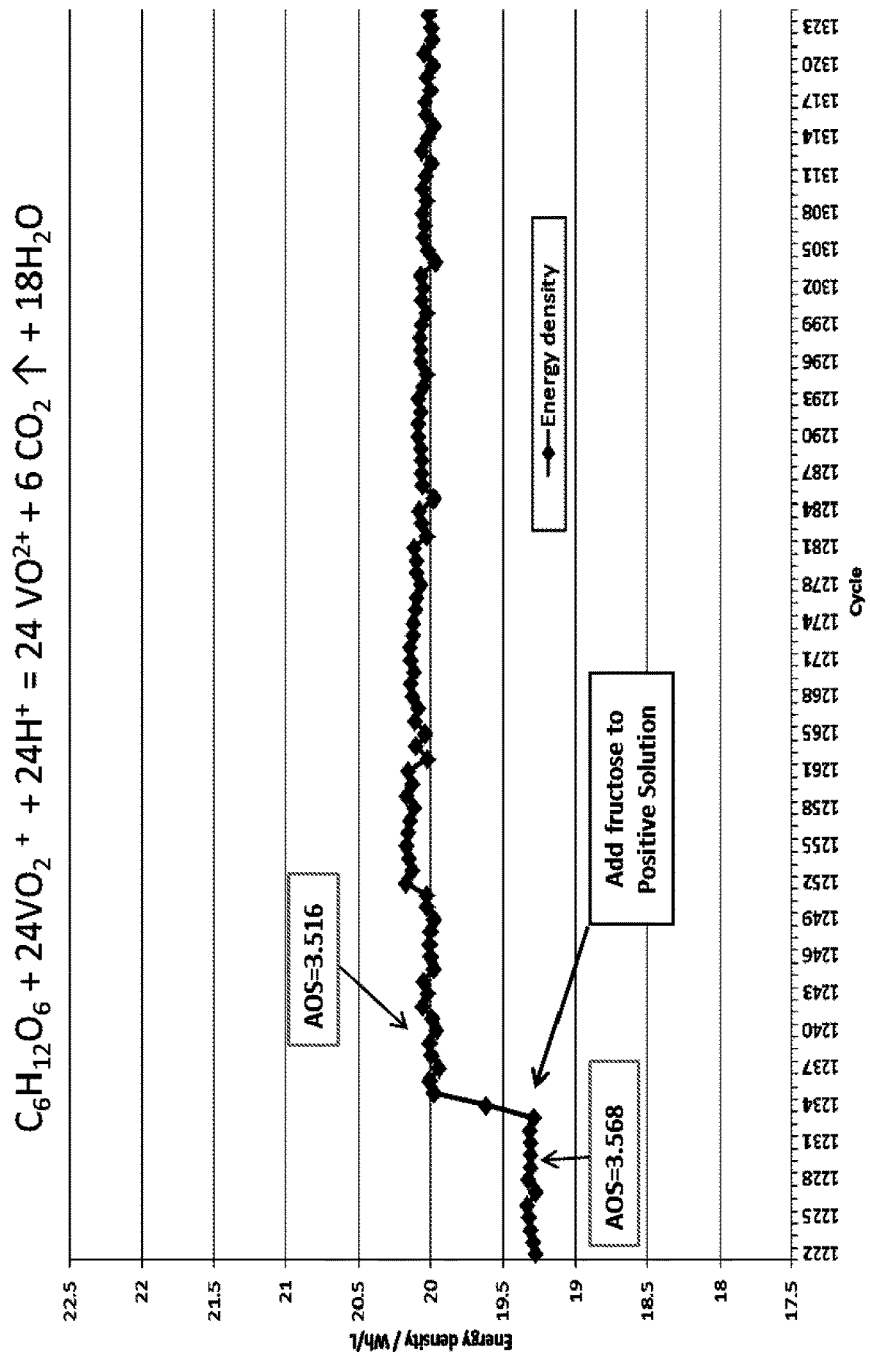
FIG. 31 is a graphical depiction regarding energy density and average oxidation state in an RFB module in accordance with one embodiment of the present disclosure.

As seen in FIG. 31, energy density and average oxidation state were recovered from about 19.25 Wh/L to over 20 Whr/L after the addition of fructose to the catholyte.

Fructose added to the catholyte is reduced according to the following formula, consuming hydrogen and generating carbon dioxide and water:

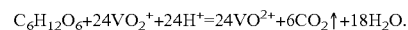

$$C_6H_{12}O_6 + 24VO_2^+ + 24H^+ = 24VO^{2+} + 6CO_2\uparrow + 18H_2O.$$

Therefore, as described above, the substantially closed gas head spaces of the illustrated embodiment can be managed to minimize energy capacity loss over time, and to maintain a non-flammable atmosphere to maximize operating safety.

Anti-Siphoning Feature

In addition to providing pressure management and other features previously described, the gas management system 94 can also be configured to provide an anti-siphoning capability to prevent siphoning of electrolyte from one battery container compartment to another in the event of a leak in the electrolyte circulation system 40. For example, an anti-siphoning arrangement may be used to prevent electrolyte in the electrolyte tanks 22 and 24 in the second container compartment 62 shown in FIG. 3B from siphoning into the first container compartment 60 that houses the cell stacks e.g., 30, 32, and 34, and other auxiliary and electrical equipment in the event of a pipe rupture in the smaller front container compartment.

In one embodiment, illustrated in FIG. 7, and described in detail below, a siphon break 180 may be provided without any active measures or valves. T-shaped tubing 186 connects the catholyte pump discharge 182 to the catholyte pump return 184, and this connecting tube 186 is also connected to the head space 188 of the catholyte tank 24. When electrolyte is being circulated, a certain amount of electrolyte continuously returns directly to the catholyte tank 24 through the tubing 186. When pumping stops, the tubing 186 connection to the head space 188 provides a siphon break.

Figure 34:
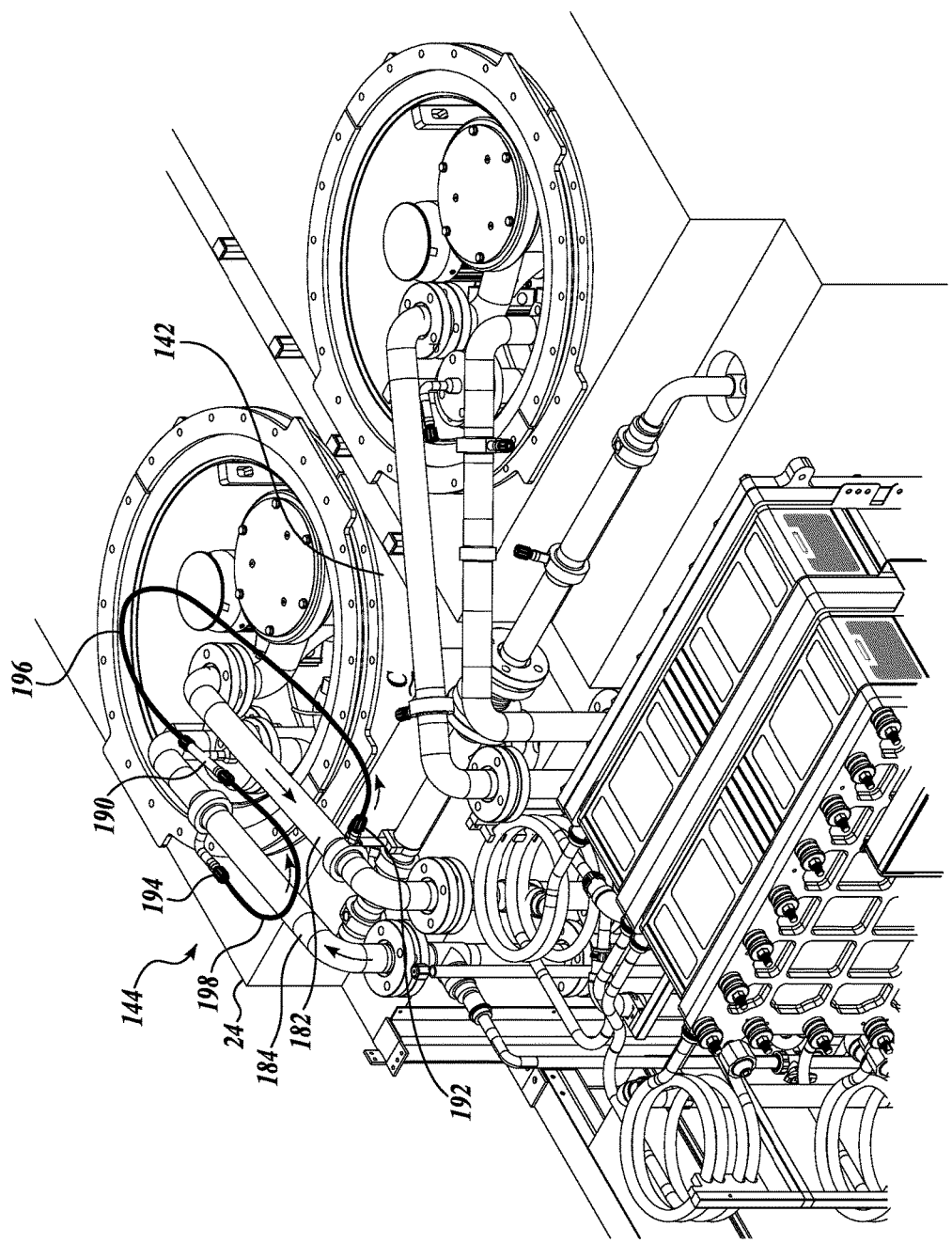
FIG. 34 is an isometric view of an anti-siphon device in accordance with one embodiment of the present disclosure.

In another embodiment, illustrated in FIG. 34, a siphon break includes an anti-siphon conduit connecting a high point in the electrolyte circulation system with the head space of one of the first and second containers or electrolyte tanks 22 and 24. The high point should be higher than the liquid level in the electrolyte tanks 22 and 24, but need not be the highest point in the system.

The siphon break includes a first anti-siphon conduit 196 connecting the first container 24 discharge conduit 182 with the first container head space 190 and a second anti-siphon conduit 198 connecting the first container return conduit 184 with the first container head space 190. Likewise, the same arrangement can be installed on the anolyte tank 22 (not shown in FIG. 34). In the illustrated embodiment, the siphon break does not include a valve.

The tubing 196 can be sized to a length and diameter to minimize pumping losses while allowing a siphon break to occur in an acceptable amount of time. In one non-limiting example, the tubing 196 may have an inside diameter of 4 mm and a length of 3.8 meters to provide a siphon break within 1 minute while minimizing pumping losses.

The fluidic connection may be tubing, piping, or some other suitable conduit that is sized in diameter and length to minimize pumping losses while proving passive anti-siphon action when pumping stops. Although active systems are within the scope of the present disclosure, advantages of a passive arrangement include the following: no active control is required; the tubing 186 are constantly flushed to maintain operability; the system is passive, and reliability is increased.

Alternate anti-siphoning embodiments that may be used to prevent siphoning of electrolyte from one container compartment to another include a non-limiting arrangement of one or more passive or active devices such as check valves, float valves, degassing valves, or activated valves.

Battery Energy Density

Evolving demands and applications for large-scale energy storage systems drive the requirement for energy dense packaging that provides site flexibility and ease of installation. Many RFB systems have relatively low system level energy density, due in part to the combination of their methods of system packaging, for example the use of traditional external tanks, or multiple containers that house the tanks separately from the balance of plant (BOP). Other limitations of traditional system energy density may be due to the inherent chemistry of the electrolyte, limited space availability for subsystems that manage shunt current losses, gasses, electrolyte utilization, or a combination of factors.

In accordance with aspects of the present disclosure, the tanks, the container, and the remaining balance of plant system, such as those described above, can be configured as a self-contained, substantially closed VRB unit that provides maximum energy storage capacity per unit size of the container, while maintaining safe and reliable operating criteria. As such, RFB module 20 shown in FIGS. 1 and 2 constructed in accordance with embodiments of the present disclosure can be configured to have an energy density of 10 watt hours per liter of electrolyte (Wh/L) or greater for an RFB battery that has an energy capacity of at least 2 kW-hours.

The RFB module 20 in embodiments of the present disclosure also may be designed to operate continuously while maintaining designed energy density for a minimum of 50 or a minimum of 100 continuous full charge/discharge cycles or the equivalent operating hours without interruption by service or user input.

General Arrangement

As discussed above the RFB module 20 described herein, as can be seen in FIGS. 1 and 2, is designed to be contained in a housing 50 having specific dimensions, for example as an ISO shipping container having a length A, width B, and height C. Space usage for the various components in the system can be optimized to maximize the amount of electrolyte that can be filled into the housing 50. As will be described in more detail below, configuration of the battery, battery sub-systems, or components themselves as well as the synergistic combinations of these elements allow the RFB 20 to achieve the specified energy density, both initially and continuously over a period of time.

Space Utilization Features

As described above, electrolyte tanks can be manufactured to fit in the available space provided in a containerized and space-optimized RFB system. In that regard, the side-by-side design of the anolyte and catholyte tanks 22 and 24 allows for maximization of the total electrolyte in the RFB 20, extending from bulkhead to rear wall.

The housing 50 is designed as structural support to facilitate the use of previously described flexible electrolyte tanks for space efficiency. In that regard, according to the present embodiment, the tanks 22 and 24 are designed to fit closely within the housing 50, further reducing required tank wall thickness and inherent tank structural requirements, and maximizing tank volume for electrolyte containment in the RFB 20. Further, the housing is fully welded to provide compact secondary containment for the electrolyte in the event of a leak, further reducing tank thickness and maximizing tank volume.

In addition to the housing 50 design, other optional components in the RFB system are designed and arranged for enhanced use of space. Such components may be used individually in specific modules or together in concert. For example, the pump tub assembly conserves BOP space in the front of the battery container, while maximizing electrolyte tank height, fill level, and volume available for electrolyte. In addition to space utilization, the pump tub assembly also helps to minimize leak hazards in the battery module. In addition, as part of the electrolyte circulation system previously described, the looped fluid conduits 88 (see FIGS. 1 and 2 provide for a compact shunt current mitigation system that maximizes fluid travel path length (component of current flow resistance), minimizes pumping losses, and improves battery overall efficiency in a small amount of space. Once again, this allows for more available tank space to contain electrolyte.

To further optimize space efficiency, the designed anolyte and catholyte tank volume ratio, such as a non-uniform tank volume ratio, can help maximum energy derived from a total electrolyte amount in both the anolyte and the catholyte.

Operational Features

In addition to space utilization features, one or more operational passive or active management features can be employed to improve the operational efficiency of the RFB module and to also extend the continuous operational period of the RFB module without shutdown.

As noted above, in addition to maximizing the amount of electrolyte contained in the system to maximize energy density, the RFB system is also designed to maintain such energy density over a certain number of cycles, for example, 100 full charge/discharge cycles. To help maintain system capacity, one or more adjustments can be made to the electrolyte during operation of the battery. For example, as the catholyte and anolyte volumes deviate from a predetermined volume, the system can be designed for a constant or periodic transfer of electrolyte from the catholyte to the anolyte (or anolyte to catholyte) to maintain predetermined tank electrolyte volumes, whether by active or passive electrolyte transfer methods. Moreover, individual batteries can automatically be periodically adjusted to conform to a selected OCV value in a string to improve long-term performance.

In addition, an optional gas management system can be employed to remove or minimize reactions that decrease performance over time and mitigate the effects of evolved gases from the electrolyte. Such gases, if left unchecked, could be harmful to the system, create a safety hazard, or require environmental emissions monitoring, particularly chlorine and excess hydrogen gas that may be generated in a RFB.

Electrolyte Composition

In addition to space management for maximizing the amount of electrolyte contained in the system to maximize energy density, the electrolyte itself may be formulated to enhance the energy storage capacity of the RFB. In accordance with embodiments of the present disclosure, in a vanadium redox flow battery, vanadium concentration is selected from the group consisting of higher than 1.5M, higher than 1.8M, and higher than 2.0M.

While embodiments have been illustrated and described, it will be appreciated that various changes can be made therein without departing from the spirit and scope of the disclosure.

The invention claimed is:

1. A method of operating a redox flow battery string, comprising:
providing a plurality of redox flow batteries, each redox flow battery in electrical communication with at least one other redox flow battery, and each redox flow battery comprising an anolyte storage tank including a quantity of anolyte, a catholyte storage tank including a quantity of catholyte, and an electrochemical cell in fluid communication with the anolyte and catholyte storage tanks;
obtaining an open circuit voltage value for each redox flow battery in the string;
identifying a predetermined open circuit voltage value in the string; and
adjusting the open circuit voltage value for each redox flow battery to correspond to the predetermined open circuit voltage value, wherein adjusting the open circuit voltage for each redox flow battery comprises transferring a volume of catholyte to the anolyte storage tank, or a volume of anolyte to the catholyte storage tank of the redox flow battery, and wherein the volume of catholyte is transferred from the catholyte storage tank of a redox flow battery or wherein the volume of anolyte is transferred from the anolyte storage tank of a redox flow battery.

2. The method of claim 1, wherein each redox flow battery is not in fluid communication with any other redox flow battery.

3. The method of claim 1, wherein each redox flow battery comprises a predetermined ratio of an amount of redox-active materials in the anolyte and an amount of redox-active materials in the catholyte, the predetermined ratio being correlated to the open circuit voltage value.

4. The method of claim 1, wherein each redox flow battery comprises a predetermined volume ratio of anolyte and the catholyte, the predetermined volume ratio being correlated to the open circuit voltage value.

5. The method of claim 4, wherein the predetermined volume ratio of the anolyte to the catholyte, or the catholyte to the anolyte, is 1:1.05 to 1:1.50.

6. The method of claim 1, wherein the volume of catholyte is transferred from the catholyte storage tank of the same redox flow battery.

7. The method of claim 1, wherein the volume of catholyte is transferred from a catholyte storage tank of a different redox flow battery.

8. The method of claim 1, wherein the volume of anolyte is transferred from the anolyte storage tank of the same redox flow battery.

9. The method of claim 1, wherein the volume of anolyte is transferred from an anolyte storage tank of a different redox flow battery.

10. The method of claim 1, wherein transferring the volume of catholyte or anolyte comprises a continuous catholyte or anolyte transfer.

11. The method of claim 1, wherein transferring the volume of catholyte or anolyte comprises a periodic catholyte or anolyte transfer.

12. The method of claim 1, wherein transferring the volume of catholyte or anolyte comprises flowing the volume of catholyte or anolyte through a conduit interconnecting the anolyte storage tank and catholyte storage tank of each redox flow battery.

13. The method of claim 12, wherein the conduit is an overflow pipe.

14. The method of claim 12, wherein transferring the volume of catholyte or anolyte comprises pumping the catholyte or anolyte through the conduit interconnecting the anolyte storage tank and catholyte storage tank.

15. The method of claim 1, comprising passively transferring the volume of catholyte or anolyte.

16. The method of claim 1, comprising actively transferring the volume of catholyte or anolyte.

17. The method of claim 1, comprising passively and actively transferring the volume of catholyte or anolyte.

18. The method of claim 1, wherein adjusting the open circuit voltage comprises adding an oxidizing agent or a reducing agent to the anolyte storage tank or the catholyte storage tank of one or more redox flow batteries in the plurality of redox flow batteries.

19. The method of claim 18, wherein the oxidizing agent is selected from the group consisting of air, oxygen, hydrogen peroxide, ozone, or any combination thereof.

20. The method of claim 18, wherein the reducing agent is selected from the group consisting of sugars, alcohols, organic acids, oils, hydrocarbons, and any combination thereof.

21. The method of claim 1, wherein adjusting the open circuit voltage is controlled by a battery management system.

22. The method of claim 1, wherein adjusting the open circuit voltage is performed during maintenance of the redox flow battery system.

23. A method of operating a redox flow battery string, comprising:
   providing a plurality of redox flow batteries, each redox flow battery in electrical communication with at least one other redox flow battery, and each redox flow battery comprising an anolyte storage tank including a quantity of anolyte, a catholyte storage tank including a quantity of catholyte, and an electrochemical cell in fluid communication with the anolyte and catholyte storage tanks;
   obtaining an open circuit voltage value for each redox flow battery in the string;
   identifying a predetermined open circuit voltage value in the string; and
   adjusting the open circuit voltage value for each redox flow battery to correspond to the predetermined open circuit voltage value, wherein adjusting the open circuit voltage comprises adding an oxidizing agent or a reducing agent to the anolyte storage tank or the catholyte storage tank of one or more redox flow batteries in the plurality of redox flow batteries.

24. The method of claim 23, wherein the oxidizing agent is selected from the group consisting of air, oxygen, hydrogen peroxide, ozone, or any combination thereof.

25. The method of claim 23, wherein the reducing agent is selected from the group consisting of sugars, alcohols, organic acids, oils, hydrocarbons, and any combination thereof.

* * * * *